United States Patent
Kobayashi et al.

(10) Patent No.: US 6,942,016 B2
(45) Date of Patent: Sep. 13, 2005

(54) HEAT PIPE

(75) Inventors: Takashi Kobayashi, Tokyo (JP); Takehide Nomura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 248 days.

(21) Appl. No.: 10/235,641

(22) Filed: Sep. 6, 2002

(65) Prior Publication Data

US 2003/0196778 A1 Oct. 23, 2003

(30) Foreign Application Priority Data

Apr. 22, 2002  (JP) .................................... 2002-119299

(51) Int. Cl.[7] ............................ F24H 3/00; F28D 15/00; F28F 7/00

(52) U.S. Cl. ............... 165/47; 165/104.11; 165/104.14; 165/185

(58) Field of Search .................. 165/41, 47, 104.11, 165/104.21, 104.26, 80.3, 185; 257/715; 361/700, 703; 174/15.2

(56) References Cited

U.S. PATENT DOCUMENTS

| | | | |
|---|---|---|---|
| 4,470,451 A | * | 9/1984 | Alario et al. ........... 165/104.26 |
| 4,880,050 A | * | 11/1989 | Nakamura et al. ............. 165/41 |
| 5,682,943 A | | 11/1997 | Yao et al. |
| 5,727,619 A | | 3/1998 | Yao et al. |
| 5,806,803 A | * | 9/1998 | Watts ........................ 244/163 |
| 5,862,462 A | * | 1/1999 | Tyner et al. ................. 455/129 |
| 5,960,866 A | * | 10/1999 | Kimura et al. ......... 165/104.33 |
| 6,189,601 B1 | * | 2/2001 | Goodman et al. .......... 165/80.3 |
| 6,382,309 B1 | * | 5/2002 | Kroliczek et al. ...... 165/104.26 |

FOREIGN PATENT DOCUMENTS

| | | | | |
|---|---|---|---|---|
| JP | 57-122551 | | 7/1982 | |
| JP | 60-235989 | | 11/1985 | |
| JP | 60-238681 | | 11/1985 | |
| JP | 63083586 A | * | 4/1988 | ........... F28D/15/02 |
| JP | 64-031370 | | 2/1989 | |
| JP | 05-190711 | | 7/1993 | |
| JP | 06-213588 | | 8/1994 | |
| JP | 07-198284 | | 8/1995 | |
| JP | 08-053100 | | 2/1996 | |
| JP | 2000-340722 | | 12/2000 | |
| JP | 2001-028417 | | 1/2001 | |

* cited by examiner

Primary Examiner—Henry Bennett
Assistant Examiner—Tho Duong
(74) Attorney, Agent, or Firm—Burns, Doane, Swecker & Mathis, L.L.P.

(57) ABSTRACT

This invention provides a heat pipe including a plurality of pipe parts for performing at least one of absorption of heat and radiation of heat through an outer surface, which are adjacent toward one direction, a flat part including a heat transfer plane created in a flat form for performing at least one of absorption of heat from and radiation of heat into outer space, created on a part of the outer surface of each of the plurality of pipe parts to be integrated with each of the pipe parts, and a fin in a flat form continuing without an uneven part from the heat transfer plane included in the flat part for providing an heat transfer plane further extended from the heat transfer plane toward an adjacent pipe part.

4 Claims, 43 Drawing Sheets

Fig. 7

| DESIGN VARIABLES LEVEL | (i) FIN LENGTH: Lf | (ii) CUT LENGTH: Lc | (iii) FIN THICKNESS: tf |
|---|---|---|---|
| MINIMUM | 10mm | 1.5mm | 1.0mm |
| MAXIMUM | 25.4mm | 2.5mm | 1.7mm |

Fig.10

| DOE No. | Lf | Lc | tf | ΔTcc(FEM) (K) | G(FEM) (W/K) | G(RSM) (W/K) | ERROR ε (%) | W(Pro/E) (g) | W(RSM) (g) | ERROR ε (%) | G PAR WEIGHT P=G/W (W/Kg) |
|---|---|---|---|---|---|---|---|---|---|---|---|
| 1 | 10 | 1.5 | 1 | 6.5551 | 0.3813824 | 0.3801688 | 0.3182329 | 1266.1 | 1265.1663 | 0.073748 | 0.000301226 |
| 2 | 10 | 2 | 1.35 | 6.4179 | 0.3895355 | 0.3891519 | 0.0984706 | 1264.4 | 1263.4663 | 0.073847 | 0.000308079 |
| 3 | 10 | 2.5 | 1.7 | 6.3567 | 0.3932858 | 0.3948831 | 0.4061356 | 1263.9 | 1265.7663 | 0.147661 | 0.000311168 |
| 4 | 17.7 | 1.5 | 1.35 | 6.1706 | 0.405147 | 0.4067443 | 0.3942467 | 1290.9 | 1292.7663 | 0.144572 | 0.000313848 |
| 5 | 17.7 | 2 | 1.7 | 6.0469 | 0.413435 | 0.4122213 | 0.2935634 | 1290.5 | 1289.5663 | 0.072353 | 0.000320368 |
| 6 | 17.7 | 2.5 | 1 | 6.7311 | 0.3714103 | 0.3710267 | 0.1032767 | 1245.4 | 1244.4663 | 0.074974 | 0.000298226 |
| 7 | 25.4 | 1.5 | 1.7 | 5.9084 | 0.4231264 | 0.4227428 | 0.0906547 | 1319.8 | 1318.8663 | 0.070747 | 0.000320599 |
| 8 | 25.4 | 2 | 1 | 6.5842 | 0.3796969 | 0.3812941 | 0.4206716 | 1266.4 | 1268.2663 | 0.147369 | 0.000299824 |
| 9 | 25.4 | 2.5 | 1.35 | 6.3817 | 0.3917451 | 0.3905315 | 0.3098175 | 1273 | 1272.0663 | 0.073348 | 0.000307734 |
| | | | | | | AVERAGE $\overline{\varepsilon}$ | 0.270563 (%) | | AVERAGE $\overline{\varepsilon}$ | 0.099582 (%) | |

Fig.11

| | ① ERROR AVERAGE $\bar{\varepsilon}$ (MAXIMUM ERROR $\varepsilon_{max}$) | ② COEFFICIENT OF DECISION AFTER ADJUSTING DEGREE OF FREEDOM $R^2_{adj}$ (COEFFICIENT OF DECISION $R^2$) |
|---|---|---|
| CONDUCTANCE G | $\bar{\varepsilon} = 0.27\%$ ($\varepsilon_{max} = 0.42\%$) | $R^2_{adj} = 0.978$ ($R^2 = 0.994$) |
| WEIGHT W | $\bar{\varepsilon} = 0.1\%$ ($\varepsilon_{max} = 0.15\%$) | $R^2_{adj} = 0.983$ ($R^2 = 0.996$) |

Fig. 12

|  | CONFIRMATION ANALYSIS BY FINITE ELEMENT METHOD | OPTIMUM VALUE OBTAINED BY RESPONSE SURFACE ESTIMATION EXPRESSION | INTERPOLATION ERROR AT OPTIMUM VALUE ε (%) |
|---|---|---|---|
| CONDUCTANCE G | 0.386757 W/K | 0.386972 W/K | 0.056 % |
| WEIGHT W | 1255.1g | 1256.928g | 0.146 % |

Fig. 27

| | CURRENT DESIGN (RELATED ART) | OPTIMIZED DESIGN (SHAPE ACCORDING TO EMBODIMENTS) ($L_j$=11.7mm, $L_c$=2.5mm, $t_r$=1.44mm) |
|---|---|---|
| THERMAL CONDUCTANCE G | 0.387W/K | 0.387W/K |
| WEIGHT W | 1425.2g | 1255.1g (−11.9%) |
| WEIGHT PERFORMANCE P (=G/W) | 2.72e-4 W/K/g | 3.08e-4 W/K/g (+13.2%) |

HEAT PIPE

BACKGROUND OF THE INVENTION

1. Field of the Invention

This invention relates to a spacecraft panel (panel with a built-in heat pipe for a spacecraft), and this invention relates to a heat pipe placed to form a grid in the panel with the built-in heat pipe for the spacecraft.

2. Description of the Related Art

FIG. 37 illustrates the spacecraft panel according to the related art.

In the spacecraft panel (panel with the built-in heat pipe for the spacecraft), a two-layer heat pipe layout is adopted. A heat pipe (called "lateral heat pipe" hereinafter) in a side facing a plane in which a device is installed and a heat pipe (called "header heat pipe" hereinafter) in a side facing a heat radiation plane are placed in orthogonal positions each other and thermally coupled. Accordingly, heat radiation efficiency is improved, and heat is exchanged.

Particularly, at a crossing part of the lateral heat pipe and the header heat pipe, a thermal joint structure is adopted for expediting thermal exchange between the lateral heat pipe and the header heat pipe. In the thermal joint structure, a fin is provided in the header heat pipe, and the lateral heat pipe and the header heat pipe are coupled thermally. The fin is provided only in the header heat pipe as it is easier to process the header heat pipe which is less than the lateral heat pipe. Further, unlike the lateral heat pipe in which a pitch is almost fixed depending on a size of the installed device, constraint in packaging, fin efficiency of a whole panel, and a structure insert position, the header heat pipe can be positioned flexibly.

FIG. 38 illustrates a joint part of a cut model of a header heat pipe of single type and a cut model of a lateral heat pipe according to the related art.

In the following explanation, the "cut model of the header heat pipe" is called "header heat pipe," and the "cut model of the lateral heat pipe" is called "lateral heat pipe."

In FIG. 38, a lateral heat pipe 10, a flat part 11, a header heat pipe 20, a flat part 21, and a fin 25 are illustrated.

FIG. 39 illustrates the header heat pipe of single type according to the related art. In FIG. 39, a pipe part 24 is illustrated.

FIG. 40 illustrates the lateral heat pipe of single type according to the related art. In FIG. 40, a pipe part 14 is illustrated.

FIG. 41 illustrates a header heat pipe of dual type according to the related art.

The flat part 21, the fin 25 and the pipe part 24 in FIG. 41 are same as those in FIG. 39. In FIG. 41, an adjacent direction 22 of the pipe part 24 is illustrated. In FIG. 41, a symmetry line 23 and a header heat pipe 200 are illustrated. In the header heat pipe 200, elements are placed symmetrically with respect to the symmetry line 23.

The fin 25 is provided in both sides of the header heat pipe 20 for increasing a heat transfer area. However, since a plurality of pipe parts 24 are adjacent in the header heat pipe 200, each of the pipe parts 24 can use the fin 25 only in one side for heat transfer. Therefore, the heat transfer area of each of fins for the header heat pipe 200 of dual type must be wider than that for the header heat pipe 20 of single type. As a result, a weight of the header heat pipe 200 becomes heavier.

FIG. 42 illustrates the header heat pipe of dual type according to the related art.

The flat part 21, the fin 25 and the pipe part 24 in FIG. 42 are same as those in FIG. 39. In FIG. 42, the adjacent direction 22 of the pipe parts 24 is illustrated. In FIG. 42, the header heat pipe 200, a concave part 17, the symmetry line 23 and an uneven part 29 are illustrated. In the header heat pipe 200, elements are placed symmetrically with respect to the symmetry line 23.

FIG. 43 illustrates a lateral heat pipe of dual type according to the related art.

The flat part 11 and the pipe part 14 in FIG. 43 are same as those in FIG. 40. In FIG. 43, an adjacent direction 12 of the pipe part 14 is illustrated. In FIG. 43, a lateral heat pipe 100 of dual type, a symmetry line 13 and the concave part 17 are illustrated. In the lateral heat pipe 100, elements are placed symmetrically with respect to the symmetry line 13.

Each of the header heat pipes 20 and 200 and the lateral heat pipes 10 and 100 is made of aluminum alloy and created by press-out processing.

In the press-out processing, a thickness of each parts must be almost equal for a purpose of processing. Otherwise, it is difficult to process a delicate inner shape of the pipe parts 14 and 24 of the heat pipe. In FIGS. 39, 40, 42 and 43, an outer shape of the pipe parts 14 and 24 is a circle similar to the inner shape of the pipe parts 14 and 24 or a polygon (octagon, for example) close to the circle.

A weight of the header heat pipe 200 in FIG. 42 is lighter than a weight of the header heat pipe 200 in FIG. 41 as the header heat pipe 200 in FIG. 42 has the concave part 17.

However, in the header heat pipe 200 in FIG. 42, the fin 25 is provided by combining the outer shape of the pipe part 24 which is the circle similar to the inner shape of the pipe part 24 or the polygon (octagon, for example) close to the circle and a shape of the fin 25 in a L shape. Therefore, the uneven part 29, i.e., groove, is created between the flat part 21, i.e., one of outer surfaces of the pipe part 24, and the fin 25 which are actual heat transfer planes. As a result, there is a problem that heat transfer efficiency is low.

In the lateral heat pipes 10 and 100, the flat part 11, i.e., actual heat transfer plane, is one of the outer surfaces of the pipe part 24 and a side of the polygon (octagon, for example).

Like the header heat pipe 200 in FIG. 42, a weight of the lateral heat pipe 100 in FIG. 43 is lighter than a weight of the lateral heat pipe without the concave part 17. However, because of the concave part 17 provided, there is a problem that the heat transfer efficiency is low.

In designing a shape of the heat pipe for the spacecraft, there are problems concerning on the heat and the weight as following (1) and (2):

(1) For reducing a weight of a spacecraft structure, it is necessary to reduce a weight of a heat pipe structure which is a main weight component of a panel by optimizing a shape of the heat pipe structure; and (2) At the same time, it is becoming impossible to ignore a temperature drop at a heat pipe joint part as a device installed in the spacecraft has come to emit heat at a high temperature. Therefore, it is necessary to set guidelines on designing of the heat pipe for reducing the weight without causing a temperature drop.

About problem (1), it is most efficient to reduce a thickness of a pipe material of the heat pipe which is a pressure container by cutting an unnecessary thickness. However, it is impossible to solve the problem (2) concerning on the heat only by reducing the thickness. Hence, competitiveness as products becomes lower in a market as it is necessary to cope with a device of which temperature gets higher and improve the radiation efficiency. For designing a high performance heat pipe panel, it is necessary to set guidelines on a sectional shape and a joint structure with a good total balance of the heat and the weight.

SUMMARY OF THE INVENTION

It is one of objects of this invention to provide a heat pipe which does not cause a temperature drop while reducing the weight.

According to an aspect of this invention, a heat pipe includes a plurality of pipe parts for performing at least one of absorption of heat and radiation of heat through an outer surface, which are adjacent toward one direction, a flat part including a heat transfer plane in a flat form for performing at least one of absorption of heat from and radiation of heat into outer space, created on a part of the outer surface of each of the plurality of pipe parts to be integrated with each of the pipe parts, and an extended heat transfer plate in a flat form continuing without an uneven part from the heat transfer plane included in the flat part for providing for each of the plurality of pipe parts an heat transfer plane further extended from the heat transfer plane toward an adjacent pipe part.

According to another aspect of this invention, the extended heat transfer plate is created in a plate form, and the heat pipe further includes a concave part created from a back side of the heat transfer plane provided by the extended heat transfer plate toward the adjacent pipe part.

According to another aspect of this invention, the heat pipe further includes a second extended heat transfer plate besides the extended heat transfer plate, in a flat form continuing without an uneven part from the heat transfer plane included in the flat part integrated with a pipe part placed at an end of the plurality of pipe parts, for providing a heat transfer plane further extended from the heat transfer plane toward outer space.

Further features and applications of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Other objects features, and advantages of the invention will be apparent from the following description when taken in conjunction with the accompany drawings.

BRIEF DESCRIPTION OF THE DRAWINGS

FIG. 7 shows a range of a design variable;

FIG. 10 shows an evaluation result;

FIG. 11 shows an evaluation result;

FIG. 12 shows an interpolation estimation error at an optimum value;

FIG. 27 is a comparison table of a heat pipe according to the related art and an optimum heat pipe;

DETAILED DESCRIPTION OF THE PREFERRED EMBODIMENTS

Embodiment 1.

Figure 1:
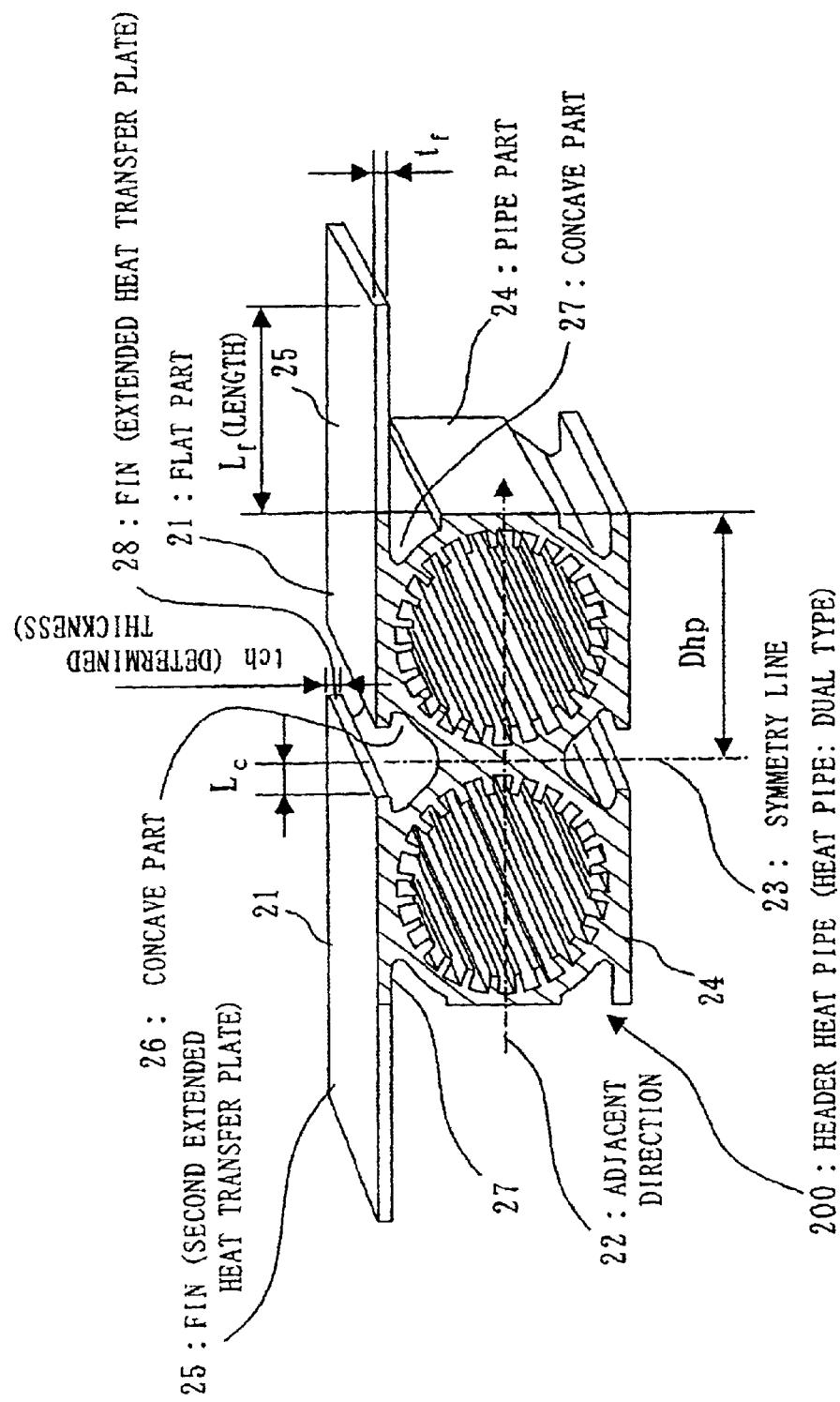
FIG. 1 illustrates a cut model of a header heat pipe of dual type in Embodiment 1.

FIG. 1 illustrates a cut model of a header heat pipe of dual type in Embodiment 1.

In FIG. 1, the flat part 21, the adjacent direction 22, the symmetry line 23, the pipe part 24, the fin 25 (an example of a second extended heat transfer plate), a concave part 26, a concave part 27, a fin 28 (an example of an extended heat transfer plate), and the header heat pipe 200 (an example of a heat pipe) are illustrated.

In the header heat pipe 200, the flat part 21, the pipe part 24, the fin 25, the concave part 27 and the fin 28 are placed symmetrically with respect to the symmetry line 23. Pipe parts 24 are adjacent toward the adjacent direction 22. Between the adjacent pipe parts 24, the concave part 26 is provided.

FIG. 1 illustrates a cut model of the header heat pipe 200 cut in a width of the fin 25 in a direction of an axis of the pipe part 24.

Figure 2:
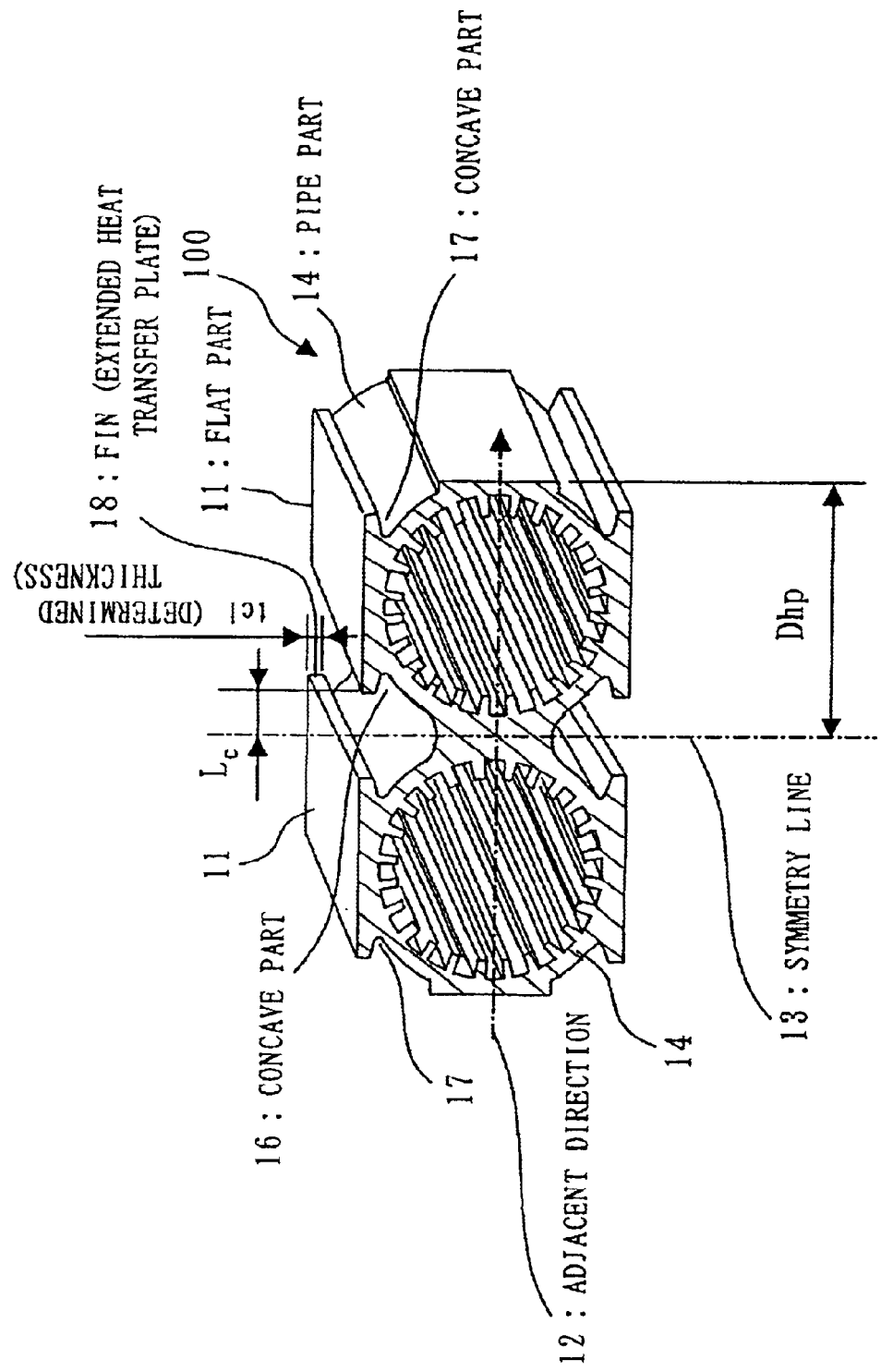
FIG. 2 illustrates a cut model of a lateral heat pipe of dual type in Embodiment 1.

FIG. 2 illustrates a cut model of a lateral heat pipe of dual type in Embodiment 1.

In FIG. 2, the flat part 11, the adjacent direction 12, the symmetry line 13, the pipe part 14, a concave part 16, the concave part 17, a fin 18 (an example of the extended heat transfer plate), and the lateral heat pipe 100 (an example of the heat pipe) are illustrated.

In the lateral heat pipe 100, the flat part 11, the pipe part 14, the concave part 17 and the fin 28 are placed symmetrically with respect to the symmetry line 13. Pipe parts 14 are adjacent toward the adjacent direction 12. Between the adjacent pipe parts 14, the concave part 16 is provided.

Figure 3:
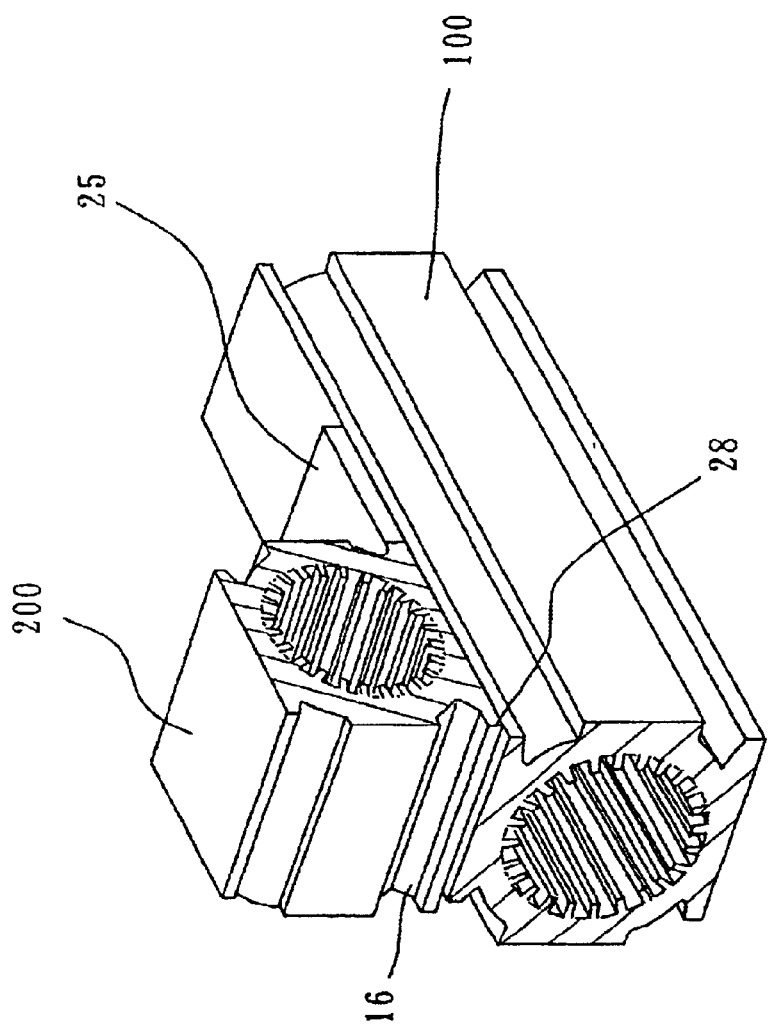
FIG. 3 illustrates a joint part of the cut model of the header heat pipe of dual type and the cut model of the lateral heat pipe in Embodiment 1.

FIG. 3 illustrates a joint part of the cut model of the header heat pipe of dual type and the cut model of the lateral heat pipe in Embodiment 1.

FIG. 3 illustrates one half of the header heat pipe 200 cut at the symmetry line 23 in FIG. 1 and one half of the lateral heat pipe 100 cut at the symmetry line 13 in FIG. 2.

FIG. 3 illustrates a cut model of the header heat pipe 200 cut in the width of the fin 25 in the direction of the axis of the pipe part 24. FIG. 3 illustrates a cut model of the lateral heat pipe 100 cut together with the header heat pipe 200 cut at the symmetry line 23.

In FIG. 3, as a thermal joint structure to couple the header heat pipe 200 to a crossing part of the lateral heat pipe 100 thermally for expediting the thermal exchange between the header heat pipe 200 and the lateral heat pipe 100, the fin 25 in a flat plate form is provided in the header heat pipe 200.

Like in the related art, the spacecraft panel has the header heat pipe 200 including the fin 25 in a flat plate form and the lateral heat pipe 100 in plane contact with the header heat pipe 200 for forming a grid together.

Figure 4:
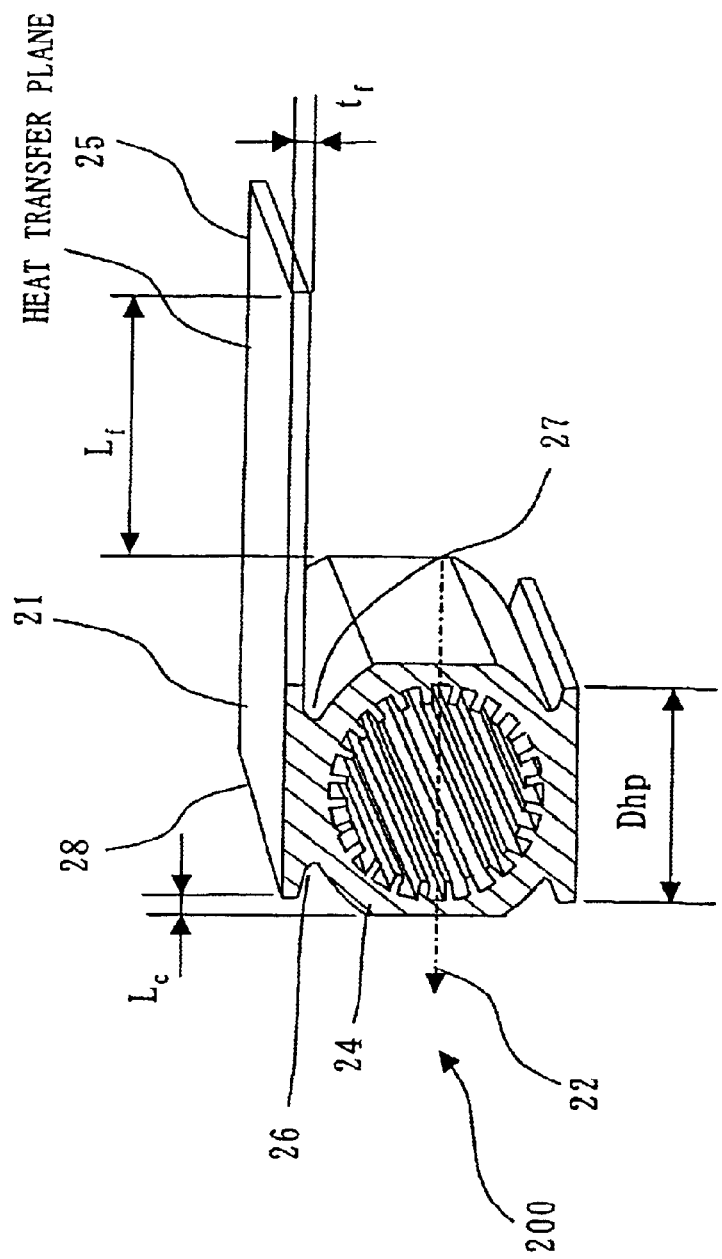
FIG. 4 illustrates one half of the cut model of the header heat pipe of dual type in FIG. 1 further cut at a symmetry line.

FIG. 4 illustrates one half of the header heat pipe of dual type in FIG. 1 cut at the symmetry line.

Figure 5:
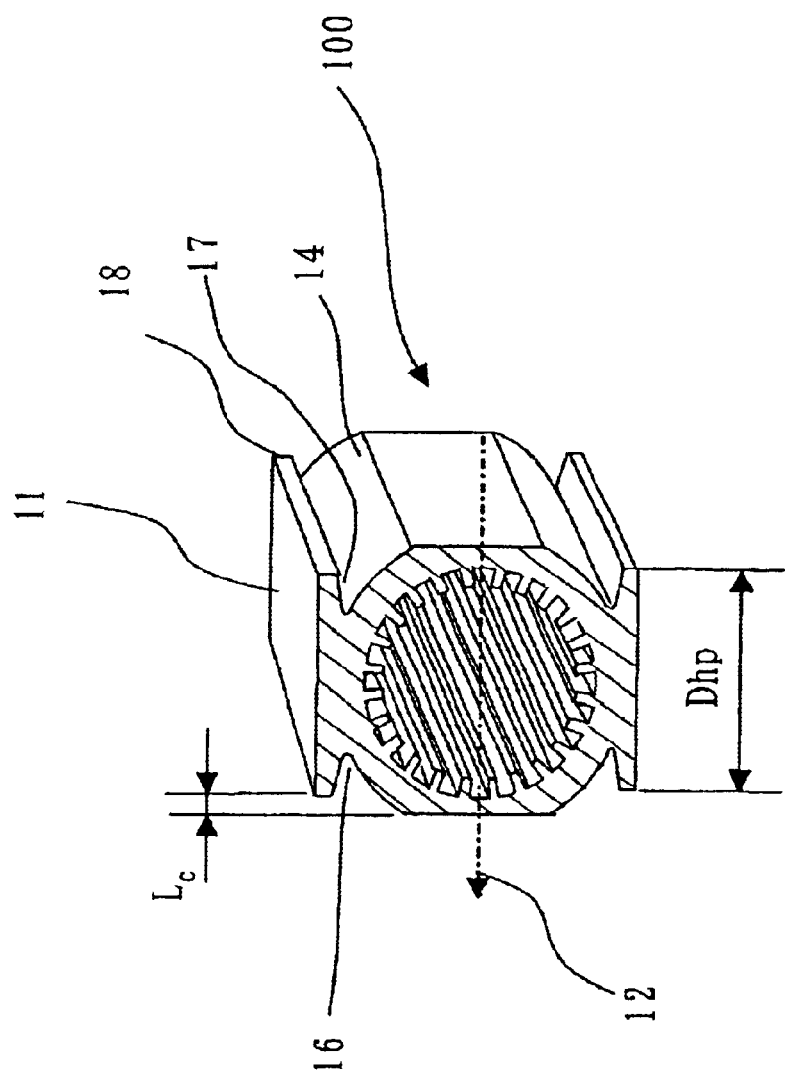
FIG. 5 illustrates one half of the cut model of the lateral heat pipe of dual type in FIG. 2 further cut at a symmetry line.

FIG. 5 illustrates one half of the lateral heat pipe of dual type in FIG. 2 cut at the symmetry line.

The header heat pipe 200 includes the flat part 21 in a flat form continuing without the uneven part from the fin 25 on the outer surface of the header heat pipe 200 for performing at least one of absorption of heat from and radiation of heat into external heat (particularly, heat of the lateral heat pipe 100), the fin 28 and the concave part 27 created from a back side of an edge of the fin 25 toward an outer surface of the pipe part 24 besides the flat part 21. The concave part 27 is created so that a thickness between an inner shape and the outer shape of the pipe part 24 and a thickness of an adhesive part of the fin 25 are almost identical or in a same level. Further, the concave part 27 connects the fin 25 and the pipe part 24 in a gentle curve toward the outer surface of the pipe part 24.

The flat part 21 is created on a part of the outer surface of the pipe part 24 to be integrated with the pipe part 24. The flat part 21 is a heat transfer plane continuing without the uneven part. The fin 25 creates the heat transfer plane continuing without the uneven part from the fin 28 through the flat part 21, i.e., a flat plane continuing without the groove which causes discontinuation of the heat transfer plane.

Unlike the design in the related art, since the flat part 21 continuing without the uneven part to the fin 25 is created, it becomes possible to expedite the thermal exchange between the header heat pipe 200 and the lateral heat pipe 100. Further, since the concave part 27 provides even thickness, it is possible to maintain the high accuracy in press-out processing.

The lateral heat pipe 100 includes the flat part 11 for performing at least one of absorption of heat from and radiation of heat into external heat (particularly, heat of the header heat pipe 200), the fin 18 and the concave part 17 created from the fin 18 toward an outer surface of the pipe part 14. The concave part 17 is created so that a thickness between an inner shape and the outer shape of the pipe part 14 and a thickness of an adhesive part of the flat part 11 are almost identical or in a same level. The concave part 17 connects the fin 18 and the pipe part 14 in a gentle curve toward the outer surface of the pipe part 14. The fin 18 and the pipe part 14 are connected by a concave curve.

The flat part 11 is created on a part of the outer surface of the pipe part 14 to be integrated with the pipe part 14. The flat part 11 is a heat transfer plane continuing without the uneven part.

Unlike the design in the related art, since the flat part 11 of which area is larger than a side of a polygon (octagon, for example) is created, a heat transfer area becomes larger. Hence, it becomes possible to expedite the thermal exchange between the header heat pipe 200 and the lateral heat pipe 100. Further, since the area of the flat part 11 is larger than an area of a side of the polygon (octagon, for example), a thickness around the flat part 11 is thicker than a thickness on the other side of the pipe part 14. Therefore, the concave part 17 is provided so that the thickness becomes almost even. Accordingly, it is possible to maintain the high accuracy in press-out processing.

The fin 28 in an opposite side of the fin 25 of the flat part 21 in the header heat pipe 200 includes the concave part 26 so that the thickness becomes almost even and the weight of the header heat pipe 200 becomes lighter.

It is also possible to provide the flat part 21, the fins 25 and 28 and the concave parts 26 and 27 regarding the header heat pipe 200 and the flat part 11, the fin 18 and the concave parts 16 and 17 regarding the lateral heat pipe 100 in a heat absorption part from a loading device in an opposite side of a joint part of the header heat pipe 200 and the lateral heat pipe 100 or a heat radiation part to a radiative heat radiation panel plane.

Unlike the fin 25, the flat part 21, the pipe part 24, the concave part 26 and the fin 28 in the header heat pipe 200 are also created in a part besides the joint part with the lateral heat pipe 100. Therefore, there is a big influence on the weight of the header heat pipe 200.

Since the concave part 26 in a mushroom shape is provided in the header heat pipe 200, it becomes possible to reduce the weight of the header heat pipe 200. Further, since the fin 28 is provided, the heat transfer efficiency can be improved while keeping the weight of the header heat pipe 200 light. Since the heat transfer efficiency can be improved, a heat transfer area of the fin 25 can be reduced. Further, since the heat transfer area of the fin 25 is reduced, the weight of the header heat pipe 200 can be further reduced.

In the lateral heat pipe 100, the flat part 11, the pipe part 14, the concave part 16 and the fin 18 are also created in a part besides the joint part with the header heat pipe 200. Therefore, there is a big influence on the weight of the lateral heat pipe 100.

Since the concave part 16 in a mushroom shape is provided in the lateral heat pipe 100, it becomes possible to reduce the weight of the lateral heat pipe 100. Further, since the fin 18 is provided, the heat transfer efficiency can be improved while keeping the weight of the lateral heat pipe 100 light.

The spacecraft panel includes the above-stated lateral heat pipe 100 and header heat pipe 200.

As stated, the lateral heat pipe 100 in Embodiment 1 includes the plurality of pipe parts 14 for performing at least one of absorption of heat and radiation of heat through the outer surface, which are adjacent toward one direction which is the adjacent direction 12, the flat part including the heat transfer plane in the flat form for performing at least one of absorption of heat from and radiation of heat into outer space, created on a part of the outer surface of each of the plurality of pipe parts 14 to be integrated with each of the pipe parts, and the fin 18 in the flat form continuing without the uneven part from the heat transfer plane included in the flat part 11 for providing the heat transfer plane further extended from the heat transfer plane toward the adjacent pipe part 14.

Further, the fin 18 is in a plate form. The lateral heat pipe 100 further includes the concave part 16 created from a back side of the heat transfer plane provided by the fin 18 toward the adjacent pipe part 14.

As stated, the header heat pipe 200 in Embodiment 1 includes the plurality of pipe parts 24 for performing at least one of absorption of heat and radiation of heat through the outer surface, which are adjacent toward one direction which is the adjacent direction 22, the flat part including the heat transfer plane in the flat form for performing at least one of absorption of heat from and radiation of heat into outer space, created on a part of the outer surface of each of the plurality of pipe parts 24 to be integrated with each of the pipe parts, and the fin 28 in the flat form continuing without the uneven part from the heat transfer plane included in the flat part 21 for providing the heat transfer plane further extended from the heat transfer plane toward the adjacent pipe part 24.

Further, the fin 28 is in a plate form. The lateral heat pipe 200 further includes the concave part 26 created from a back side of the heat transfer plane provided by the fin 28 toward the adjacent pipe part 24.

The header heat pipe 200 further includes the fin 25 besides the fin 28, in a flat form continuing without the uneven part toward outer space outside of the header heat pipe 200 from the heat transfer plane included in the flat part 21 integrated with the pipe part 24 placed at an end of the plurality of pipe parts 24, for providing the heat transfer plane further extended from the heat transfer plane.

As stated, the spacecraft panel in Embodiment 1 includes the header heat pipe 200 and the lateral heat pipe 100. The header heat pipe 200 includes the pipe part 24, the fin 25 in a flat plate form, the flat part 21 in a flat form continuing without the uneven part from the fin 25 on the outer surface for transferring heat toward external heat and the concave part 27 created from the edge of the fin 25 toward the outer surface of the pipe part 24 besides the flat part 21. The lateral heat pipe 100 is in plane contact with the header heat pipe 200 for forming a grid, and includes the concave part 17 created from an edge of a contact plane with the header heat pipe 200 toward the outer surface of the pipe part 14.

The spacecraft panel in Embodiment 1 includes a first pipe part 14 for performing at least one of absorption of heat and radiation of heat through the outer surface, a first flat part 11 created on a part of the outer surface of the first pipe part 14 to be integrated with the first pipe part 14 and connected to the fin 18 like a brim of a hat for performing at least one of absorption of heat and radiation of heat through the outer surface toward the first pipe part 14, the concave part 16 connecting the fin 18 and a determined position of the outer surface of the first pipe part 14, a second pipe part 24 for forming a grid together with the first pipe part 14 through the first flat part 11 for performing at least one of absorption of heat and radiation of heat through the outer surface, a second flat part 21 created on a part of the outer surface of the second pipe part 24 to be integrated with the second pipe part 24 for performing at least one of absorption of heat from and radiation of heat to the first flat part 11, which includes a heat transfer plane in a flat form, and the fin 25 in a flat form continuing without the uneven part from the heat transfer plane for providing a heat transfer plane extended from the heat transfer plane.

As stated, the lateral heat pipe 100 in Embodiment 1 is the lateral heat pipe 100 for the spacecraft panel. The lateral heat pipe 100 includes the pipe part 14 for performing at least one of absorption of heat and radiation of heat through the outer surface, the flat part 11 created on a part of the outer surface of the pipe part 14 to be integrated with the pipe part 14 for performing at least one of absorption of heat from and radiation of heat into outer space and the pipe part 14, which includes the fin 18 like a brim of a hat, and the concave part 16 connecting the fin 18 and a determined position of the outer surface of the pipe part 14.

Further, the header heat pipe 200 in Embodiment 1 is the header heat pipe 200 for the spacecraft panel. The header heat pipe 200 includes the pipe part 24 for performing at least one of absorption of heat and radiation of heat through the outer surface, the flat part 21 created on a part of the outer surface of the pipe part 24 to be integrated with the pipe part 24, including a heat transfer plane in a flat form for performing at least one of absorption of heat from and radiation of heat into outer space, and a fin 25 or 28 in a flat plate form continuing without the uneven part from the heat transfer plane for providing a heat transfer plane extended from the heat transfer plane.

The fins 25 and 28 are in a plate form. The header heat pipe 200 further includes the concave part 27 forming a curve from a back side of the heat transfer plane provided by the fin 25 toward a determined position on the outer surface of the pipe part 24.

In Embodiment 1, the lateral heat pipe 100 of dual type (two pipes integrated type) and the header heat pipe 200 of dual type (two pipes integrated type) are used. However, this invention is not limited to the two pipes integrated type. Three or more pipes integrated type is also possible. For example, in a header heat pipe of three or more pipes integrated type, it is possible that the fin 25 is provided for pipes at both ends.

Embodiment 2.

In Embodiment 2, a heat pipe is designed based on a result of thermal and weight optimization of the design of the heat pipe for the spacecraft panel by analysis of a 3-dimensional finite element method and a response surface method using detailed design data according to 3-dimensional CAD (Computer Aided Design).

The design of the heat pipe is same as FIGS. 1–5. In the thermal analysis, if design is symmetrical, an analysis result of one side is same for the other side. Therefore, in the header heat pipe 200 of dual type in FIG. 1, a result can be expanded symmetrically with respect to the symmetry line 23. In the lateral heat pipe 100 of dual type in FIG. 2, a result can be expanded symmetrically with respect to the symmetry line 13.

Figure 37:
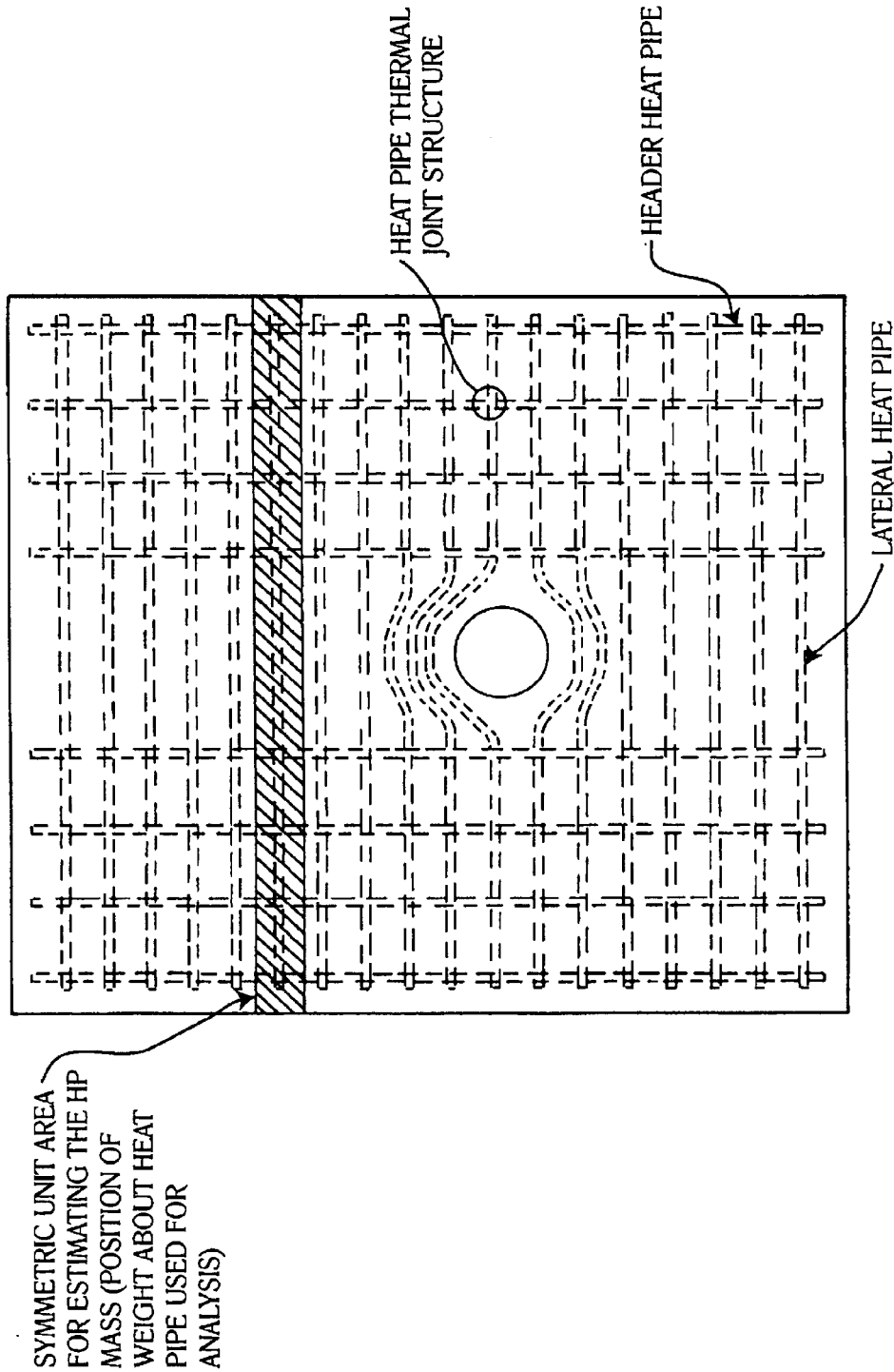
FIG. 37 illustrates a spacecraft panel according to the related art.
Figure 38:
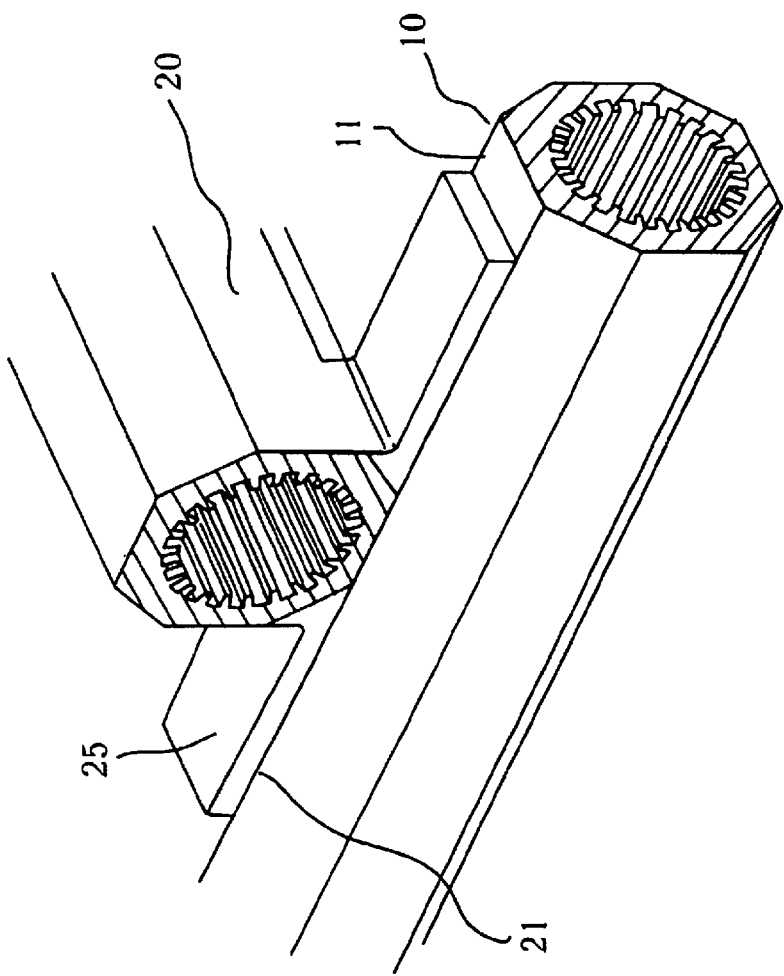
FIG. 38 illustrates a joint part of the cut model of the header heat pipe and the cut model of the lateral heat pipe according to the related art.
Figure 39:
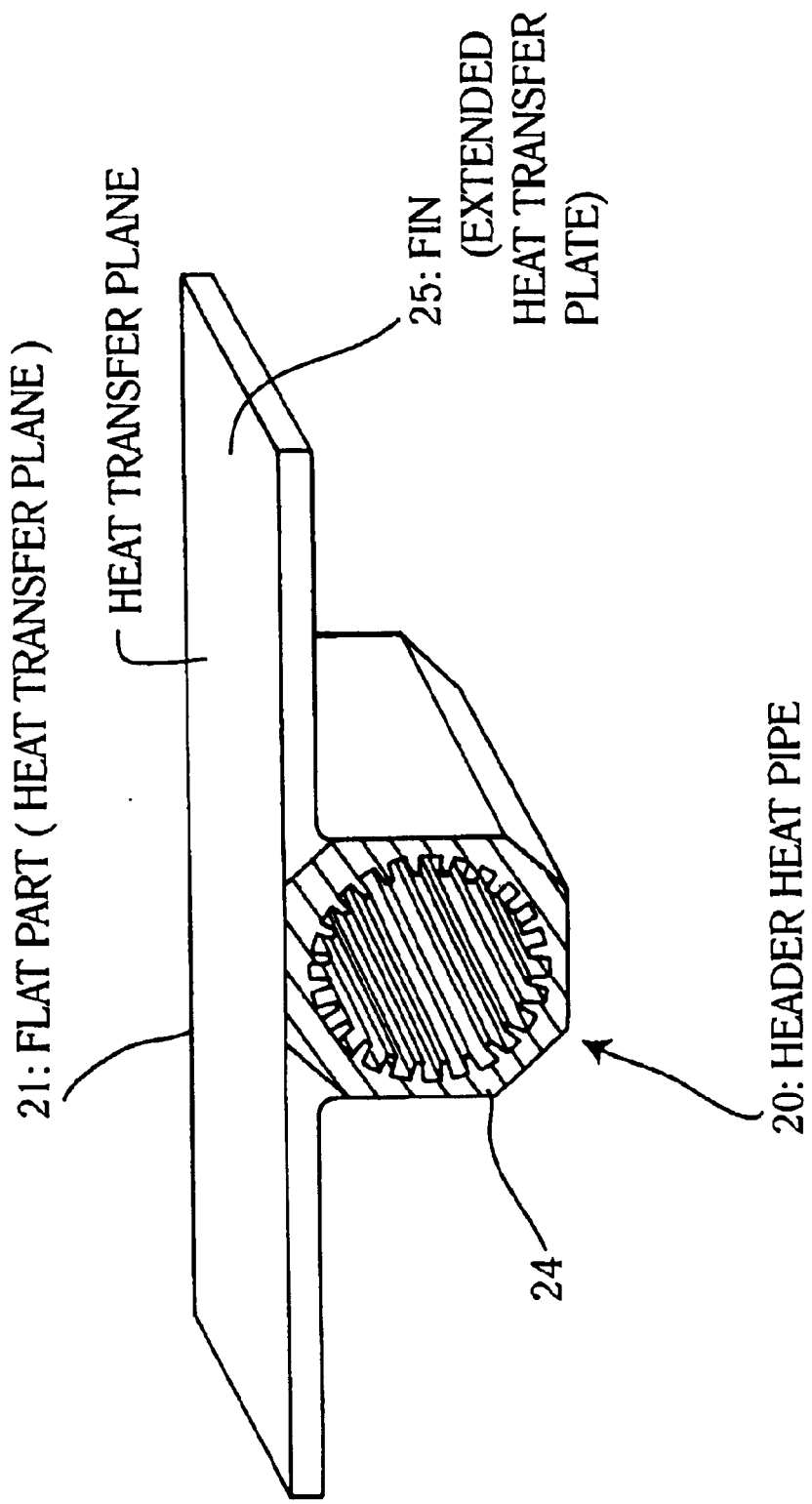
FIG. 39 illustrates the header heat pipe according to the related art.
Figure 40:
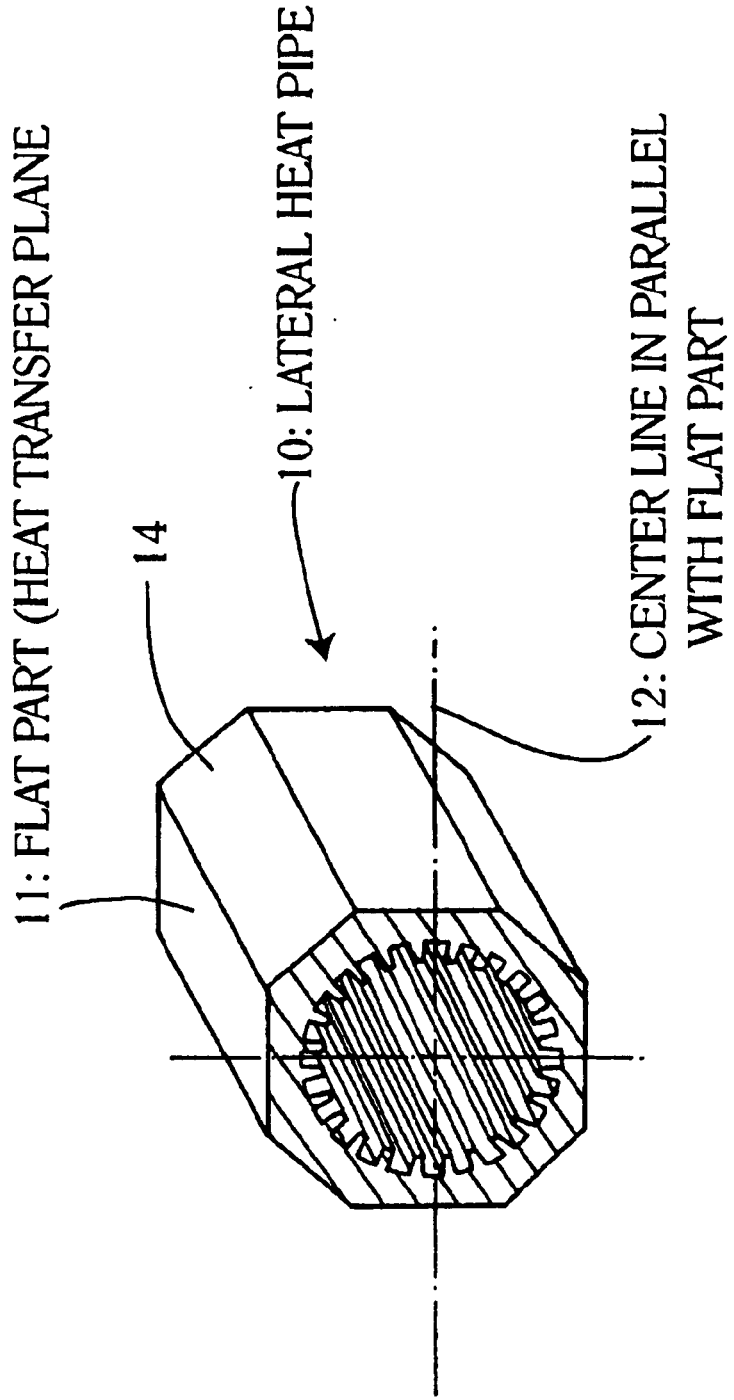
FIG. 40 illustrates the lateral heat pipe according to the related art.
Figure 41:
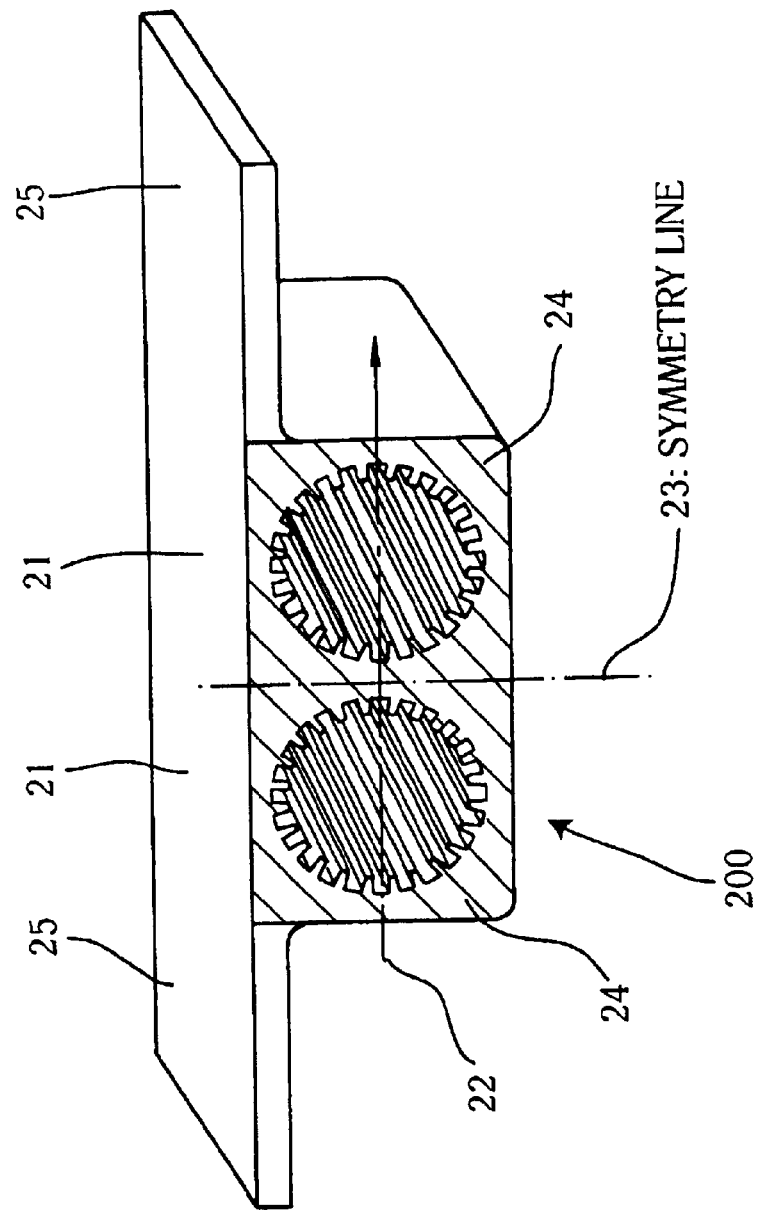
FIG. 41 illustrates the header heat pipe of dual type according to the related art.
Figure 42:
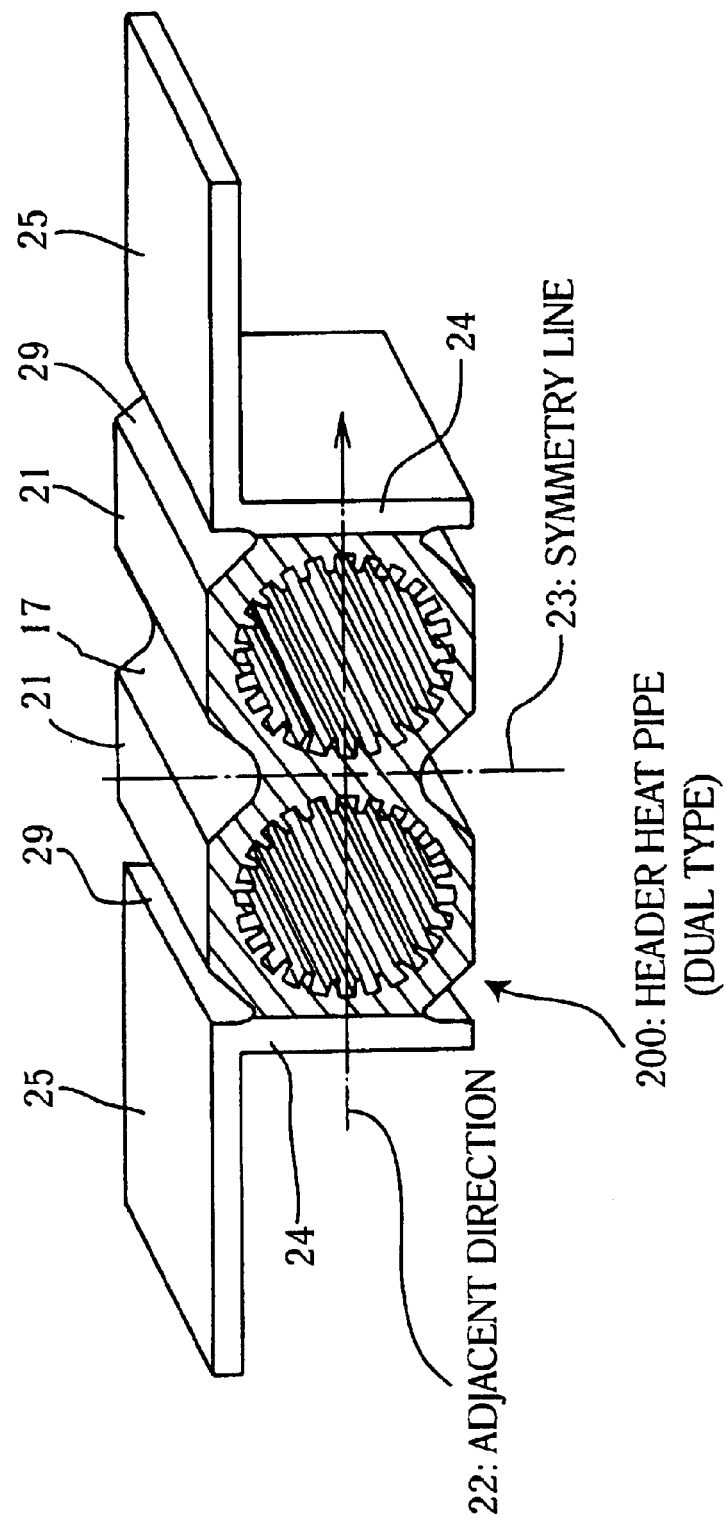
FIG. 42 illustrates the header heat pipe of dual type according to the related art.
Figure 43:
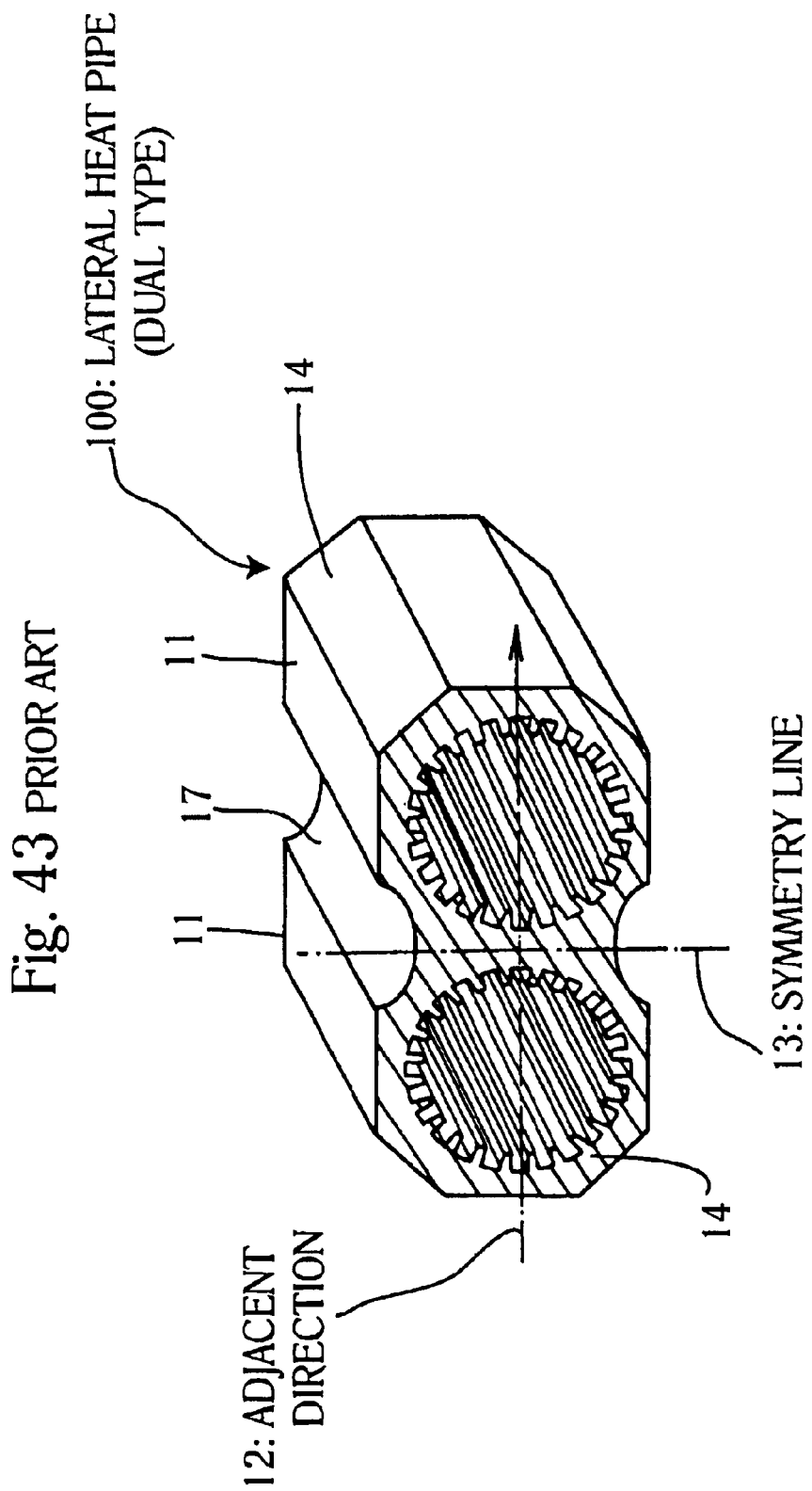
FIG. 43 illustrates the lateral heat pipe of dual type according to the related art.

In Embodiment 2, regarding weight W, a weight about the heat pipe in a shaded area in FIG. 37 is used as a symmetry unit area and set as reference unit weight W. Therefore, it is possible to convert the weight to a weight about the heat pipe per panel by multiplying W by 18 (in a case of lateral 18 rows, for example). In the shaded area, there are eight header heat pipes 20 and 14 flange fins 25 for one lateral heat pipe 10.

An outer width of the pipe part 14 of the lateral heat pipe 10 and an outer width of the pipe part 24 of the header heat pipe 20 are both 13 mm.

It is considered that a specific gravity of aluminum alloy is 2.71 g/cm$^3$.

Concerning on application of the response surface method to thermal design of the spacecraft, the response surface method is explained at first.

The response surface method (abbreviated as RSM hereinafter) is a statistical design method like Taguchi method. The response surface method is different from the Taguchi method which is a qualitative method. In the response surface method, solution space is approximated and predicted using a quantitative expression. The response surface method is studied and used practically in a field of designing a machine system particularly in airplane and car industries in the US.

In the response surface method, response causal relation between n design input variables and output response solution y is approximated using a mathematical model. Normally, for selecting an analysis point for spreading the response surface, design of experiments is used, and a curved surface is created by polynomial expression approximation.

In the response surface method, an approximation expression is estimated from a relatively small number of experiment points. Therefore, the response surface method has an advantage that many points as in spline interpolation are not necessary for estimating the approximation expression. As an example, a case of creating a response surface of quadratic polynomials by a method of least squares is explained.

$$y = \beta_0 + \sum_{j=1}^{k} \beta_j x_j + \sum_{j=1}^{k} \beta_{jj} x_j^2 + \sum_{i<j}\sum \beta_{ij} x_i x_j \quad (1)$$

In the expression (1), by variable conversion using $$x_3 = x_1^2, \; x_4 = x_2^2, \; x_5 = x_1 x_2,$$

the expression can be converted to a linear expression. Expression (1) can be converted to a multi-variable 1-dimensional expression. A regression model (multiple linear regression model) regarding n variables can be obtained by the following expression.

$$\hat{Y} = X\beta \quad (2)$$

$$Y = X\beta + \epsilon \quad (3)$$

$$\epsilon = Y - \hat{Y} \quad (4)$$

In the expressions,
$\hat{Y}$
is a column vector of the fitted regression model estimated from k sample models, and Y is the observations. $\beta$ is a coefficient vector of multiple repression, and $\epsilon$ is vector of residuals.

$$Y = \begin{Bmatrix} y_1 \\ y_2 \\ \vdots \\ y_k \end{Bmatrix}, \quad X = \begin{bmatrix} 1 & x_{11} & x_{12} & \cdots & x_{1n} \\ 1 & x_{21} & x_{22} & \cdots & x_{2n} \\ 1 & \vdots & \vdots & \ddots & \vdots \\ 1 & x_{kl} & x_{k2} & \cdots & x_{kn} \end{bmatrix}$$

$$\beta = \begin{Bmatrix} \beta_1 \\ \beta_2 \\ \vdots \\ \beta_k \end{Bmatrix}, \quad \varepsilon = \begin{Bmatrix} \varepsilon_1 \\ \varepsilon_2 \\ \vdots \\ \varepsilon_k \end{Bmatrix}$$

An unknown coefficient $\beta$ in expression (1) can be calculated by the method of least squares for minimizing square sum of errors ($SS_E$). In the following expression (6), T is an inverted matrix symbol.

$$L = SS_E = \sum_{i=1}^{k} \varepsilon_i^2 = \sum_{i=1}^{k} (y_i - \hat{y}_i)^2 \quad (5)$$

-continued $$= \varepsilon^T \varepsilon \qquad (6)$$
$$= (Y - X\beta)^T (Y - X\beta)$$
$$= Y^T Y - \beta^T X^T Y - Y^T X\beta + \beta^T X^T X\beta$$
$$= Y^T Y - 2\beta^T X^T Y + \beta^T X^T X\beta$$
$$= Y^T Y - b^T X^T Y$$

In the expressions, b is least squares estimations of the coefficient β as following expression (7):

$$b = (X^T X)^{-1} X^T Y \qquad (7)$$

Figure 6:
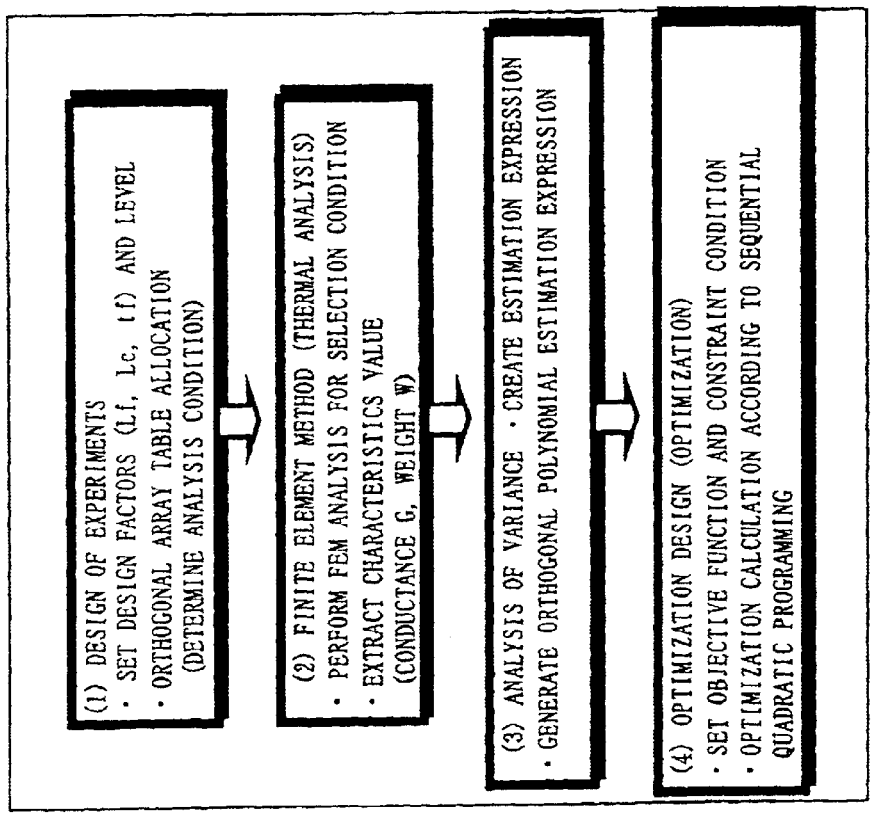
FIG. 6 shows a flow chart of creating a response surface.
Figure 8:
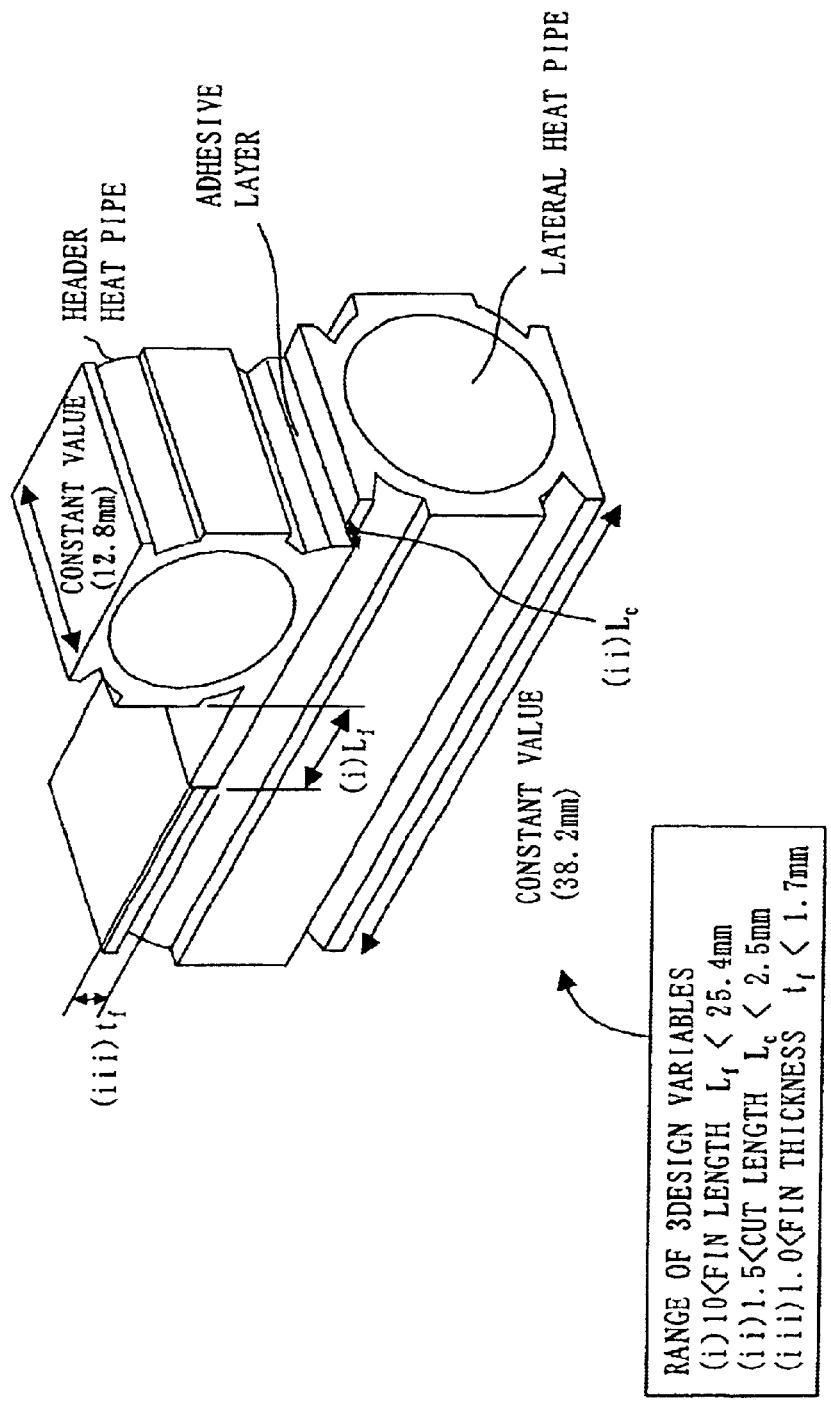
FIG. 8 illustrates an example of a 3-dimensional thermal analysis model.

Concerning on a creating procedure in the response surface method, FIG. 6 shows a flow chart of creating the response surface. A range of a design variable is illustrated in FIG. 7. An example of a 3-dimensional thermal analysis model is illustrated in FIG. 8.

In the following, the creating procedure of the response surface is explained.

(1) About Selecting the Design Variable and Determining a Level Range

FIG. 1 illustrates the fin length Lf and the fin thickness tf. FIGS. 2 and 3 illustrate the cut length Lc of the heat pipe.

In FIG. 8, above (i) the fin length Lf, (ii) the cut length Lc of the heat pipe, and (iii) the fin thickness tf are important design parameters of the heat pipe.

Therefore, orthogonal programming is performed by using three design variables and the level range set in FIG. 7. Dimension parameters besides above three variables are invariable and constant. Assumed design factors and level range are as illustrated in FIG. 7. When attention is paid to a specific level of an allocated parameter, a minimum number of combinations of analysis conditions is selected by using an orthogonal table of Design of experiments (called "DOE" hereinafter), which is a combination table including all influence of other parameters equally. By using the orthogonal table, a degree of influence on a characteristic value by each of design factors can be obtained independently regarding each of the factors.

Therefore, it will be possible to predict solution space by analyzing numeric values in a less number of times instead of calculating all combinations of the parameters. As orthogonal conditions, it is necessary that a repeat number in a level of each of factors is same and an inner product of any two rows of each of the factors is 0.

Figure 9:
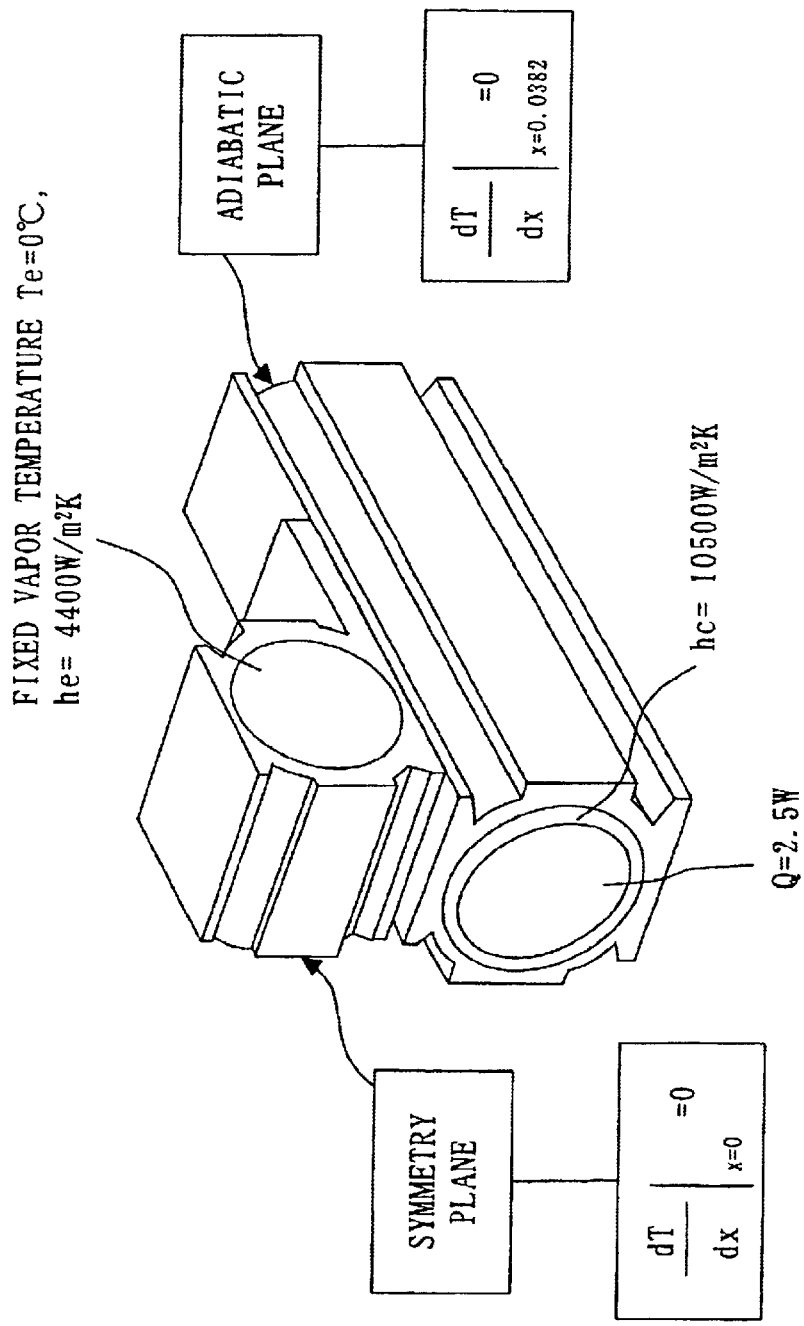
FIG. 9 shows an analysis condition by a finite element method at a thermal joint part.
Figure 13:
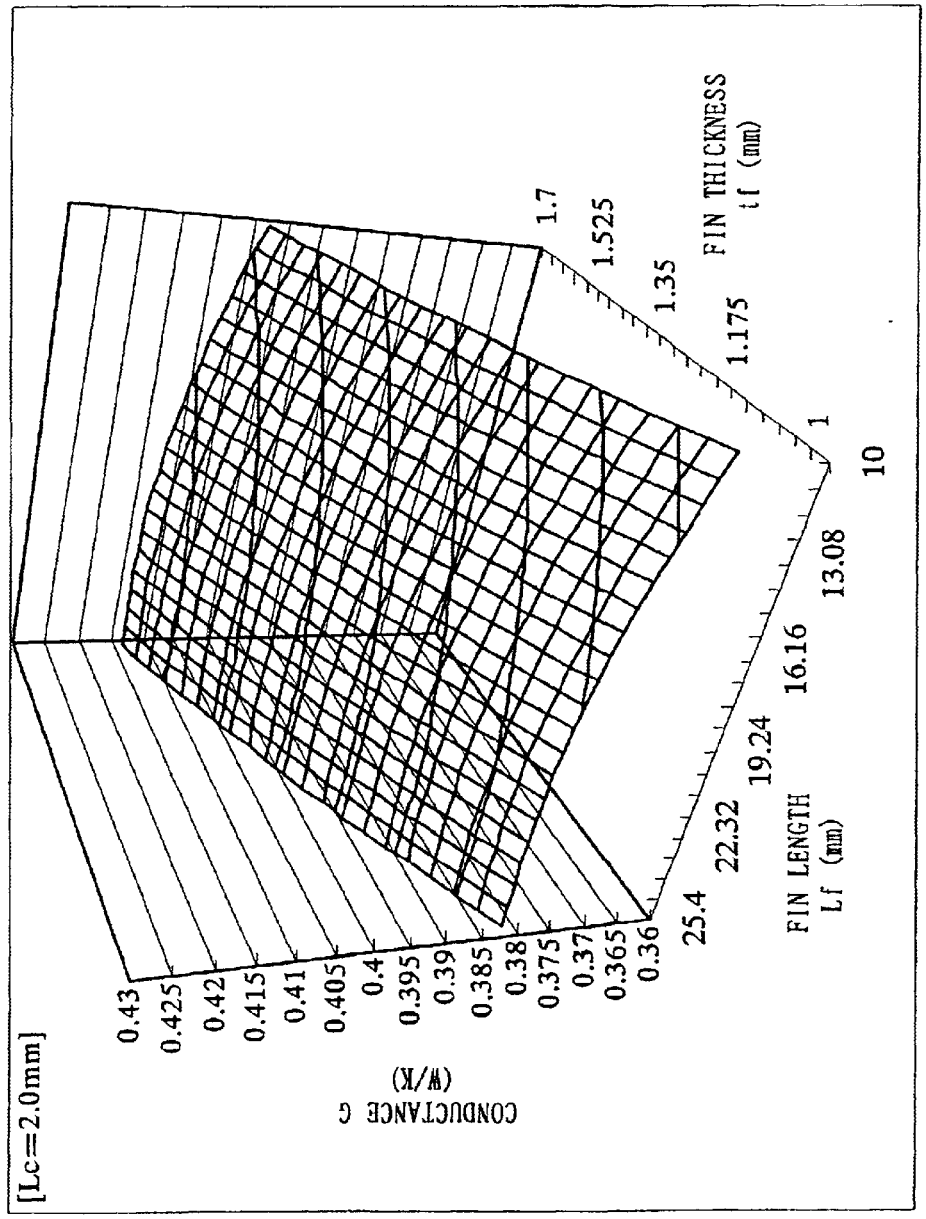
FIG. 13 illustrates a solution space graph (response surface) created based on a characteristics estimation expression regarding conductance G and weight W.
Figure 14:
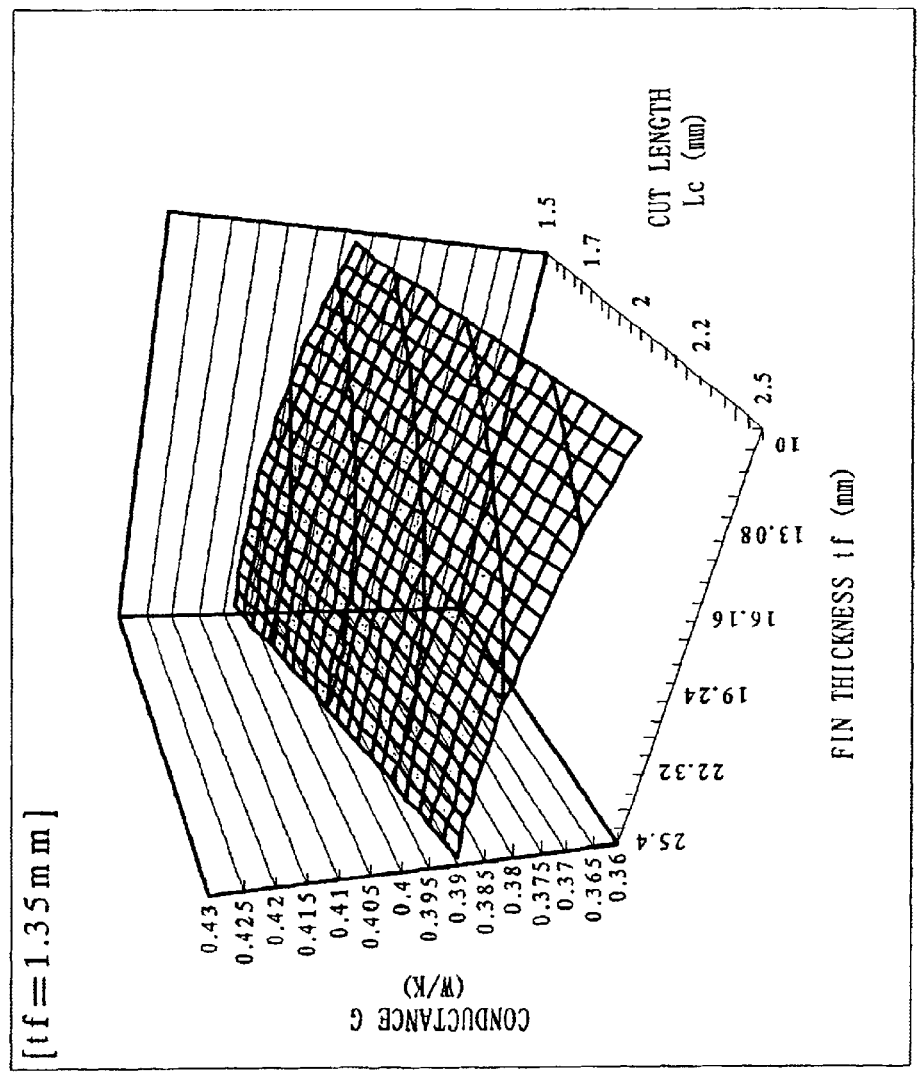
FIG. 14 illustrates a solution space graph (response surface) created based on a characteristics estimation expression regarding conductance G and weight W.
Figure 15:
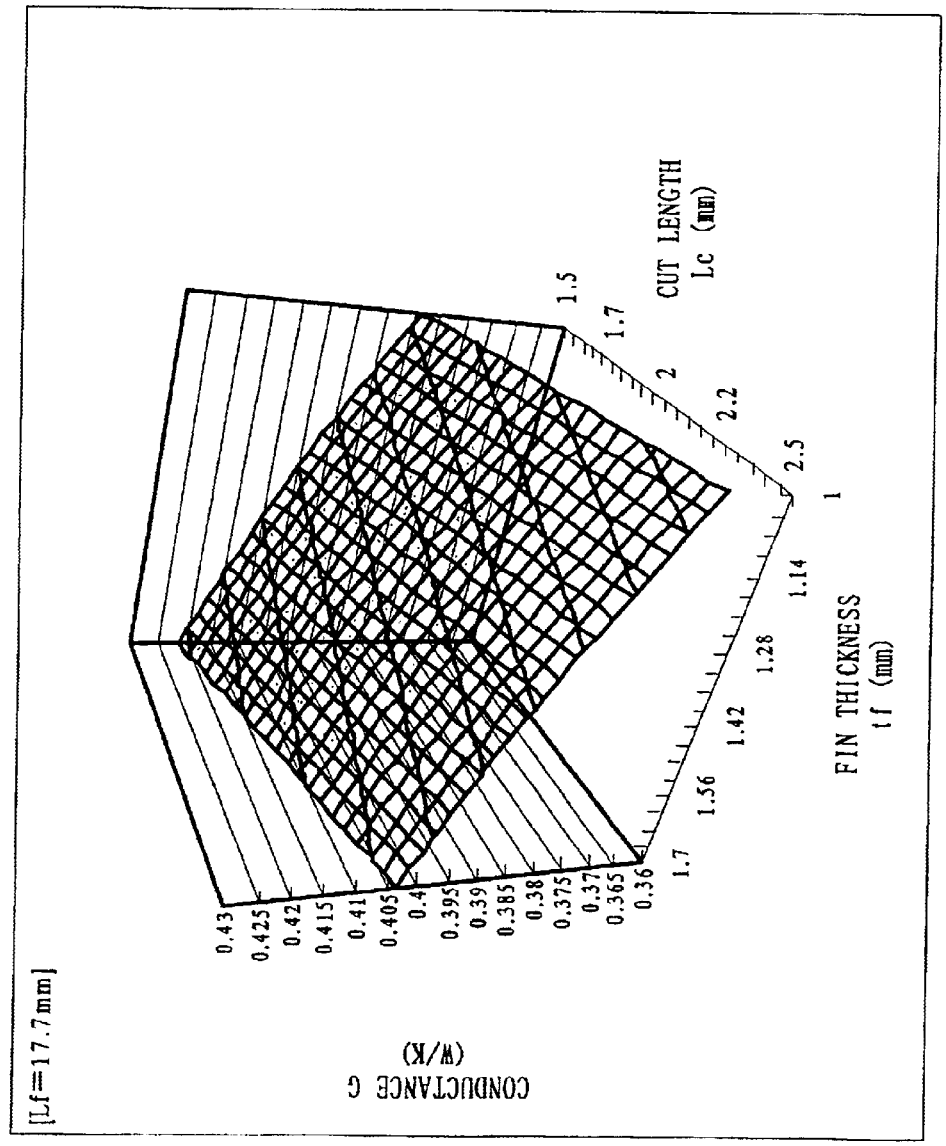
FIG. 15 illustrates a solution space graph (response surface) created based on a characteristics estimation expression regarding conductance G and weight W.
Figure 16:
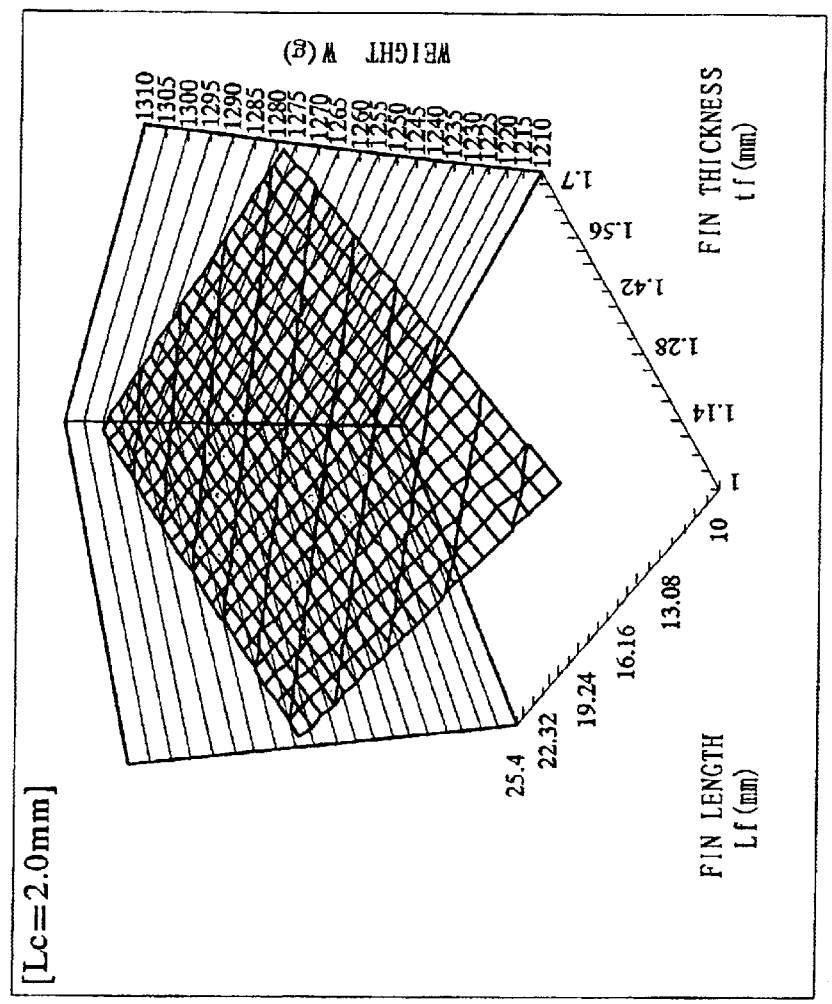
FIG. 16 illustrates a solution space graph (response surface) created based on a characteristics estimation expression regarding conductance G and weight W.
Figure 17:
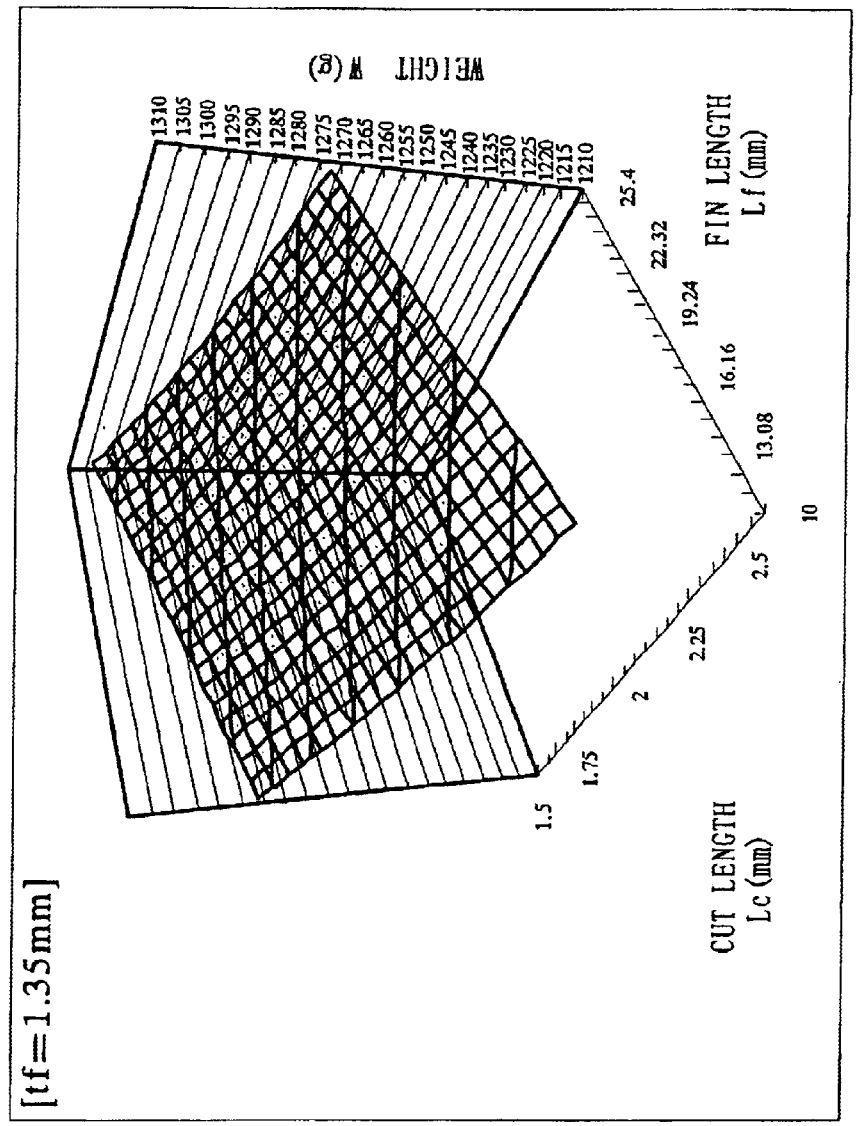
FIG. 17 illustrates a solution space graph (response surface) created based on a characteristics estimation expression regarding conductance G and weight W.
Figure 18:
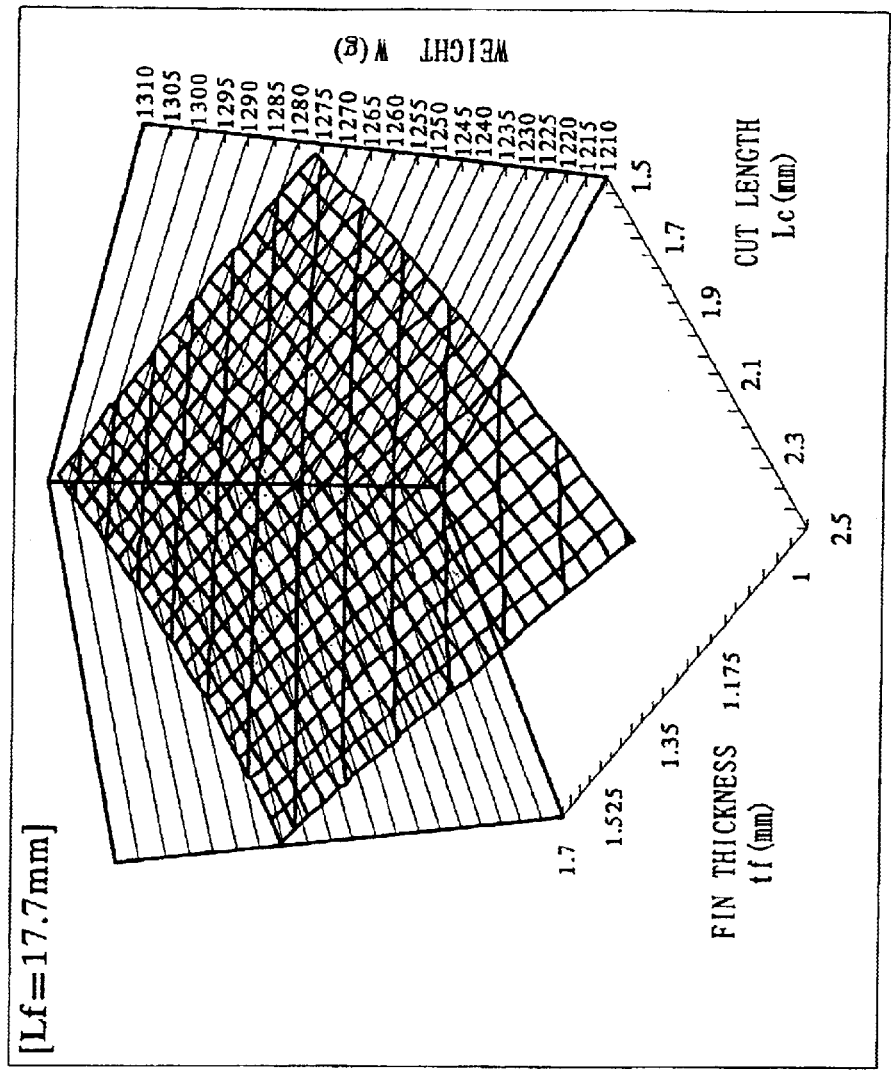
FIG. 18 illustrates a solution space graph (response surface) created based on a characteristics estimation expression regarding conductance G and weight W.
Figure 19:
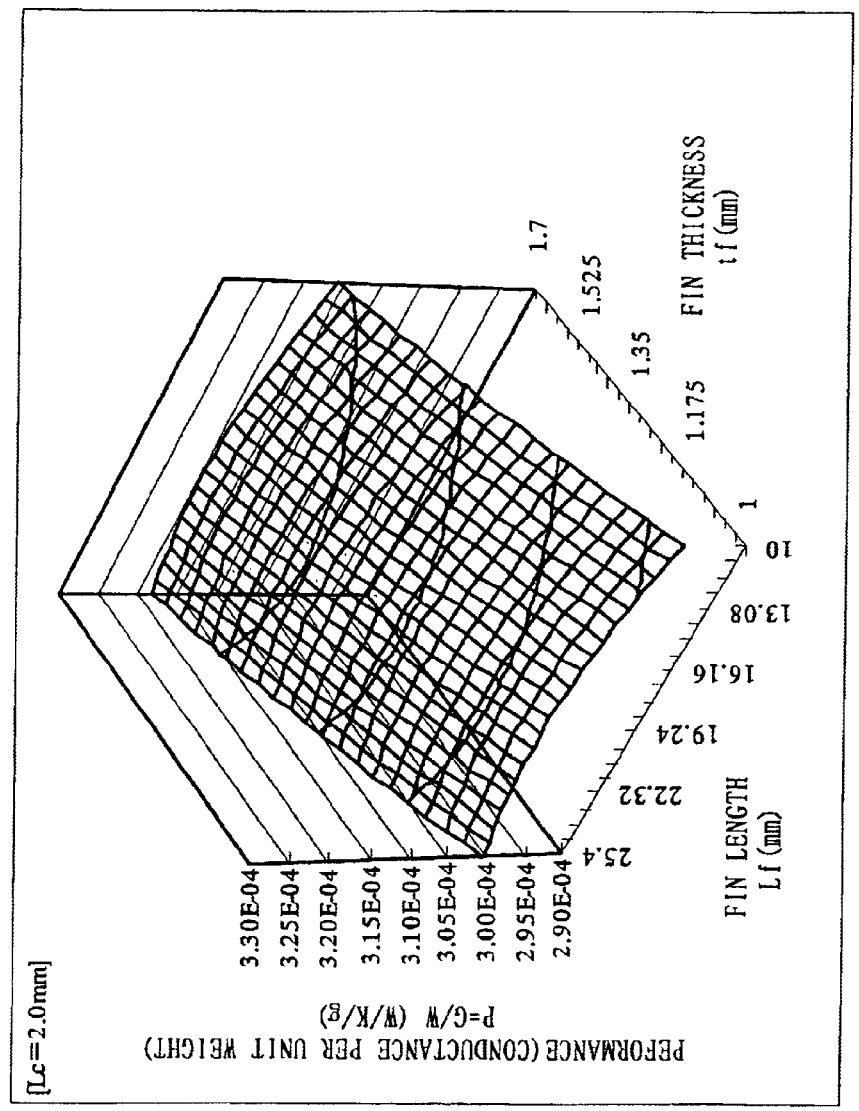
FIG. 19 illustrates a solution space graph (response surface) created based on a characteristics estimation expression regarding conductance G and weight W.
Figure 20:
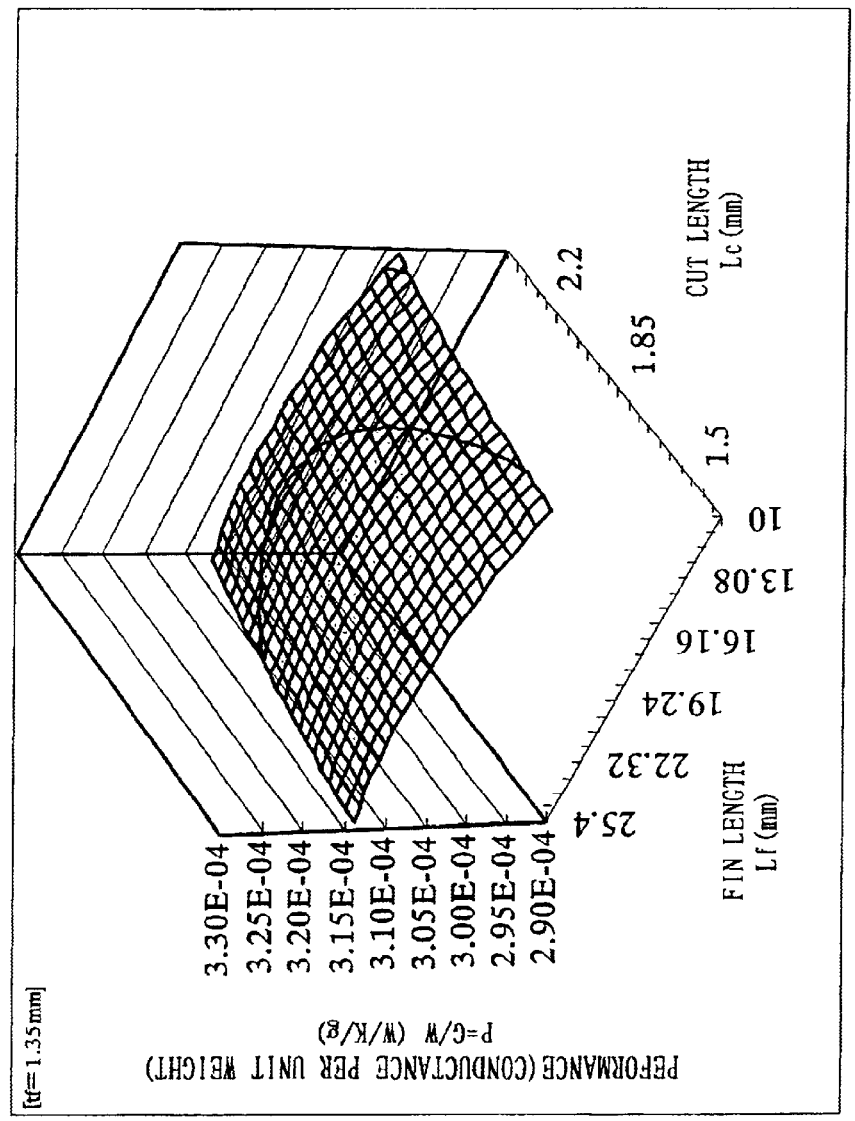
FIG. 20 illustrates a solution space graph (response surface) created based on a characteristics estimation expression regarding conductance G and weight W.
Figure 21:
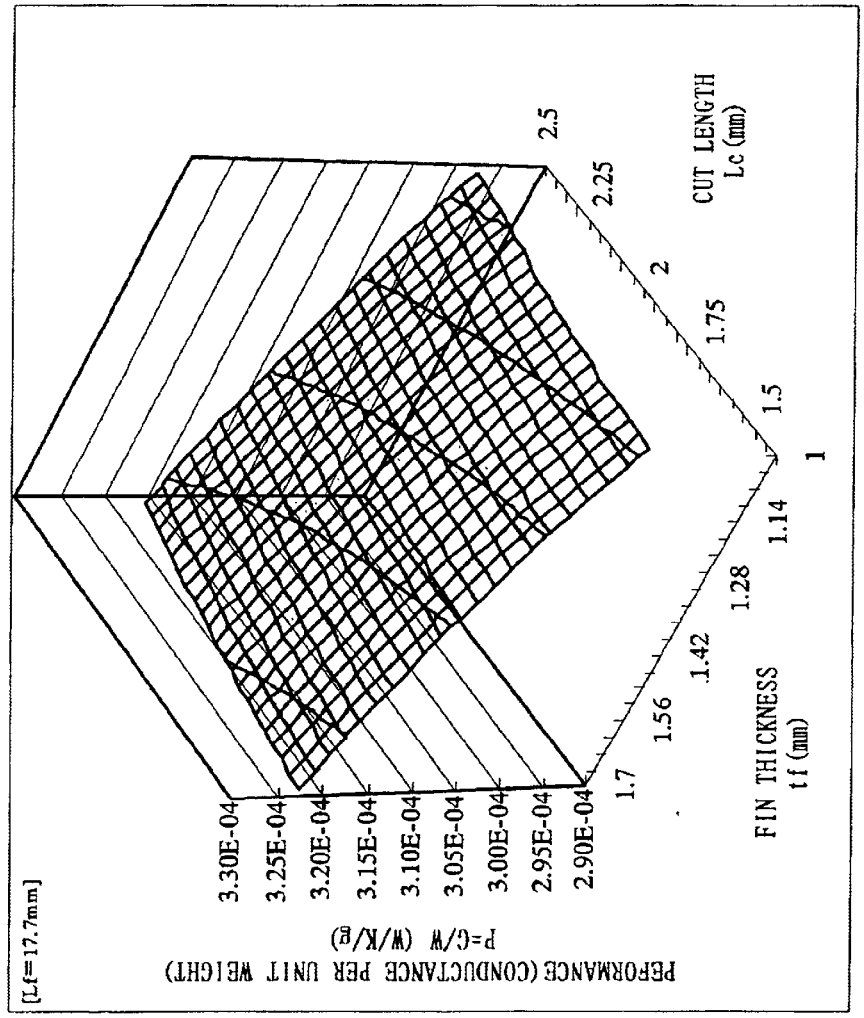
FIG. 21 illustrates a solution space graph (response surface) created based on a characteristics estimation expression regarding conductance G and weight W.

(2) Analysis by the Finite Element Method in a Condition Selected from the Orthogonal Table FIG. 9 illustrates an analysis condition by the finite element method at the thermal joint part.

About an analysis condition selected in orthogonal array table allocation, 3-dimensional thermal conductivity analysis using expression (8) is performed by the finite element method (called "FEM" hereinafter), and thermal conductance G is calculated. FIG. 9 illustrates a thermal conductivity analysis model of the heat pipe joint part by importing 3-dimensional CAD design data directly. In this structure, since it is a symmetry unit area, only ¼ of the heat pipe joint part is used. As a unit condition, a vapor temperature Te of the header heat pipe 200 is fixed at a reference temperature (0° C.), and a temperature Tc of condensing operation liquid is obtained. In expression (8), λ is a coefficient of thermal conductivity.

$\dot{Q}$ is wattage (watt).

$$\lambda \left( \frac{\partial^2 T}{\partial x^2} + \frac{\partial^2 T}{\partial y^2} + \frac{\partial^2 T}{\partial z^2} \right) + \dot{Q} = 0 \qquad (8)$$

In analysis by the finite element method, since it is impossible to handle a coefficient hc of heat transfer of vapor vs. wall in a side of the lateral heat pipe 10 by a circuit network method, a coefficient $\lambda_{\mathit{eff}}$ of equivalent thermal conductivity is calculated from expression (9), and a model is provided and studied.

Condensing heat resistance Re, an outer diameter $d_o$ of a vapor model in a heat pipe group, a length L of the heat pipe model, a reference surface area Ai based on an inner diameter of the vapor model in the heat pipe group are in expression (9).

$$R_c = \frac{\ln\left(\frac{d_o}{d_i}\right)}{2\pi L \cdot \lambda_{\mathit{eff}}} = \frac{1}{h_c A_i} = \frac{1}{h_c (\pi d_i L)} \qquad (9)$$

$$\lambda_{\mathit{eff}} \frac{h_c d_i}{2} \ln\left(\frac{d_o}{d_i}\right) \; [\text{W/mK}]$$

(3) Generation of an Orthogonal Polynomial Expression Regarding Characteristic Values G and W For each experiment programming sample point, an orthogonal polynomial expression (response surface estimation expression) is generated by using an orthogonal function of Chebyshev regarding thermal conductance G and weight W of the heat pipe joint part obtained by the FEM analysis. G is thermal conductance between the vapor temperature Te of the header heat pipe 20 and the vapor temperature Tc of the lateral heat pipe 10 calculated from expression (19). In expression (10), $\dot{Q}$ is a passing heat amount of 2.5 W in an ¼ model part when it is assumed that a thermal load amount of one joint part is 10 W.

$$G = \frac{\dot{Q}}{(T_c - T_e)} \qquad (10)$$

Further, for approximating the thermal conductance G by quadratic polynomials, an orthogonal table of $L_9$ (variables of four factors in maximum can be set in three levels, and a number of sample data is nine.) is used. When an influence of interaction among the variables is introduced, a number of necessary analysis condition is increased, and it becomes impossible to use it as a practical design method. Therefore, an interaction term was not introduced. As an example, an estimation approximation expression regarding G and W is shown in following expressions (11) and (12).

$$G_{(RSM)} = 0.3162746 + 0.002768108 * L_f - 0.00005962897 * L_f^2 - 0.01977126 * Lc + 0.00050827 * Lc^2 + 0.08500013 * t_f - 0.01431088 * t_f^2 \qquad (11)$$

$$W_{(RSM)} = 1283.375 + 1.402597 * L_f - 1.278314E - 15 * L_f^2 - 75.5 * Lc + 11 * Lc^2 + 62.38776 * t_f - 6.122449 * t_f^2 \qquad (12)$$

(4) Setting of Constraint Conditions and an Objective Function and Optimization Calculation An optimization problem of this invention to minimize the weight while maintaining thermal characteristics can be formalized as expression (13).

(a) Side Constraint (13)

Subject to (i) $10 \leq L_f$ (Fin Length) $\leq 25.4$ mm (ii) $1.5 \leq Lc$ (Fin collar Length) $\leq 2.5$ mm (iii) $1.0 \leq t_f$ (Fin thickness) $\leq 1.7$ mm (b) Behavioral Constraint Subject to Thermal Conductance $G \geq 0.387$ W/K ($= 2.5$ W/$6.467$ K)

(c) Objective Function

Minimize $W$ (TotalWeight of $HP$ Joint Structure)

In this condition, a sequential quadratic programming method which is stated later is applied to a 2-dimensional response surface estimation expression generated regarding the thermal conductance and the weight, and a parameter for minimizing a weight W of the objective function is identified by using a thermal conductance G of a present heat pipe as a constraint condition value. An identified optimum parameter solution is Lf=11.7 mm, Lc=2.5 mm, tf=1.44 mm. While thermal performance of the present heat pipe is maintained, a weight of the heat pipe can be reduced by 12% approximately.

The sequential quadratic programming (SQP) method is one of Newton methods. It is an iteration method of approximating a provided general nonlinear optimization problem sequentially in a quadratic programming problem as one of present problems and producing a dot string to converge and reach a requested optimum solution. The quadratic programming problem is a nonlinear optimum problem of a specific form of a 1-dimensional constraint function and a 2-dimensional objective function. In the sequential quadratic programming method, the objective function of an original optimum problem is approximated to a 2-dimensional function and the constraint condition is approximated to a 1-dimensional function for generating a 2-dimensional programming problem. Then, iterative calculation is performed.

In the following, verification of regression accuracy of the response surface is studied.

In a process of considering and solving the design problem in engineering, it is necessary to view the design solution space widely by approximating and producing a simple model. In this invention, an estimation expression is generated and a mathematical model is produced by the response surface method using a method of design of experiments. According to the methods, the design problem can be formalized by a small number of experiments (analyses). By analyzing sensitivity regarding the expression and processing through a mathematical procedure as a mathematical calculation problem, it is possible to solve ambiguity and obtain an optimum value theoretically.

However, the obtained response surface is only an approximation expression generated based on a minimum number of numeric value experiment representative points selected by the method of design of experiments.

Therefore, since the effectiveness and the practicalness of this method depend on the accuracy of the estimation expression, which shows the repeatability of phenomenon, it is necessary to authorize and confirm the regression accuracy of the estimation expression and the error.

Therefore, a predicted estimation accuracy of the response surface is evaluated by (a) an estimation error average at a sampling point $\bar{\varepsilon}$ , and (b) a coefficient $R^2_{adj}$ of determination after adjusting degree of freedom.

(a) About Accuracy Evaluation Based on the Error Average at the Sampling Point $\bar{\varepsilon}$ for verifying the estimation error E and the error average by the regression expression, $\bar{\varepsilon}$ the estimation accuracy regarding G and W at sampling points (nine points) selected by the method of design of experiments is evaluated by expressions (14) and (15).

An evaluation result is illustrated in FIG. 10.

$$\varepsilon = \frac{|y_i - \hat{y}_i|}{y_i} * 100 \qquad (14)$$

$$\bar{\varepsilon} = \frac{1}{9}\sum_{i=1}^{9} \frac{|y_i - \hat{y}_i|}{y_i} * 100 \qquad (15)$$

(b) About Accuracy Evaluation Based on the Coefficient $R^2_{adj}$ of Determination After Adjusting Degree of Freedom As an index for evaluating the approximation accuracy and a relevance degree, there is a coefficient $R^2$ of multiple determination used in a multiple regression analysis. The coefficient of multiple determination indicates a ratio which can be explained by a regression expression among objective variables. The coefficient of multiple determination is a value in a range between 0 and 1. When the value is close to 1, the relevance and the approximation accuracy at the sampling point is high. However, since the coefficient of multiple determination is increased when an explanation variable (coefficient vector β in expression (1)) is increased, the coefficient $R^2_{adj}$ of determination after adjusting degree of freedom in considering and correcting a number n of the explanation variables and a number k of the samples is introduced, and (vector of) residuals per unit degree of freedom is evaluated.

$$R^2_{adj} = 1 - \frac{SS_E}{S_{yy}} \cdot \frac{k-1}{k-p} \qquad (16)$$

$$= 1 - \left(\frac{k-1}{k-p}\right)(1 - R^2)$$

A total sum of squares $S_{yy}$ of the model can be decomposed into a regression sum of squares $SS_R$ and sum of squares of (vector of) residuals $SS_E$.

$$S_{yy} = SS_R + SS_E \qquad (17)$$

$$SS_R = b^T X^T Y - \frac{\left(\sum_{i=1}^{k} y_i\right)^2}{k}$$

$$S_{yy} = Y^T Y - \frac{\left(\sum_{i=1}^{k} y_i\right)^2}{k}$$

FIG. 11 illustrates an evaluation result.

FIG. 11 illustrates the evaluation result regarding each of evaluation indices (a) and (b).

As a conclusion, it shows a good result. The estimation error average of the conductance G $\overline{\epsilon}$ is 0.27% (maximum error $\epsilon_{MAX}$=0.42%), and the coefficient $R^2_{adj}$ of determination after adjusting degree of freedom is 0.978. This is a good evaluation result. The estimation error average of the weight W $\overline{\epsilon}$ is 0.1% or less (maximum error $\epsilon_{MAX}$=0.15%), and the coefficient $R^2_{adj}$ of determination after adjusting degree of freedom is 0.983. It is a level which can be ignored like G. It is confirmed that the regression accuracy is a level which is sufficient for using practically.

Concerning on the response surface estimation expression, a confirmation analysis regarding an optimum parameter solution, i.e., Lf=11.7 mm, Lc=2.5 mm, tf=1.4 mm, identified by SQP is performed by the finite element method.

FIG. 12 illustrates an interpolation estimation error at an optimum value.

As shown in a result of FIG. 12, the interpolation estimation error, i.e., 0.0056% in the conductance G and 0.146% in the weight W, at the optimum value is small, and it is confirmed that the interpolation prediction by the estimation expression is possible.

In the following, explanations are made on guidelines on designing of the heat pipe by the sensitivity analysis in considering the thermal and weight characteristics and knowledge obtained by the sensitivity analysis.

FIGS. 13–21 illustrate solution space graphs (response surface) created based on expressions (11) and (12) which are characteristics estimation expressions obtained regarding the conductance G and the weight W.

A performance evaluation index P (weight performance) showing conductance per unit weight calculated from expression (18) is introduced.

$$P = \frac{G}{W} \quad [W/K/g] \tag{18}$$

Figure 22:
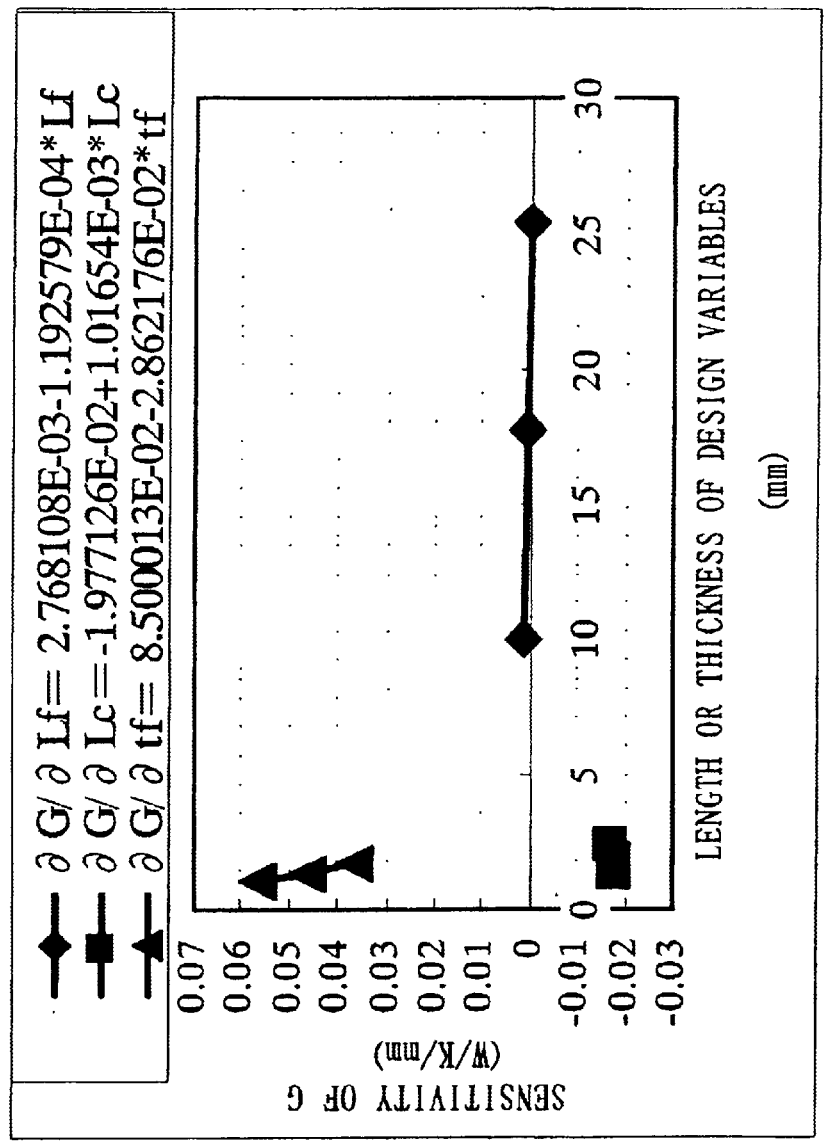
FIG. 22 shows a result of sensitivity analysis by partially differentiating a polynomial estimation expression regarding conductance G and weight W with respect to each of design variables Lf, Lc and tf.
Figure 23:
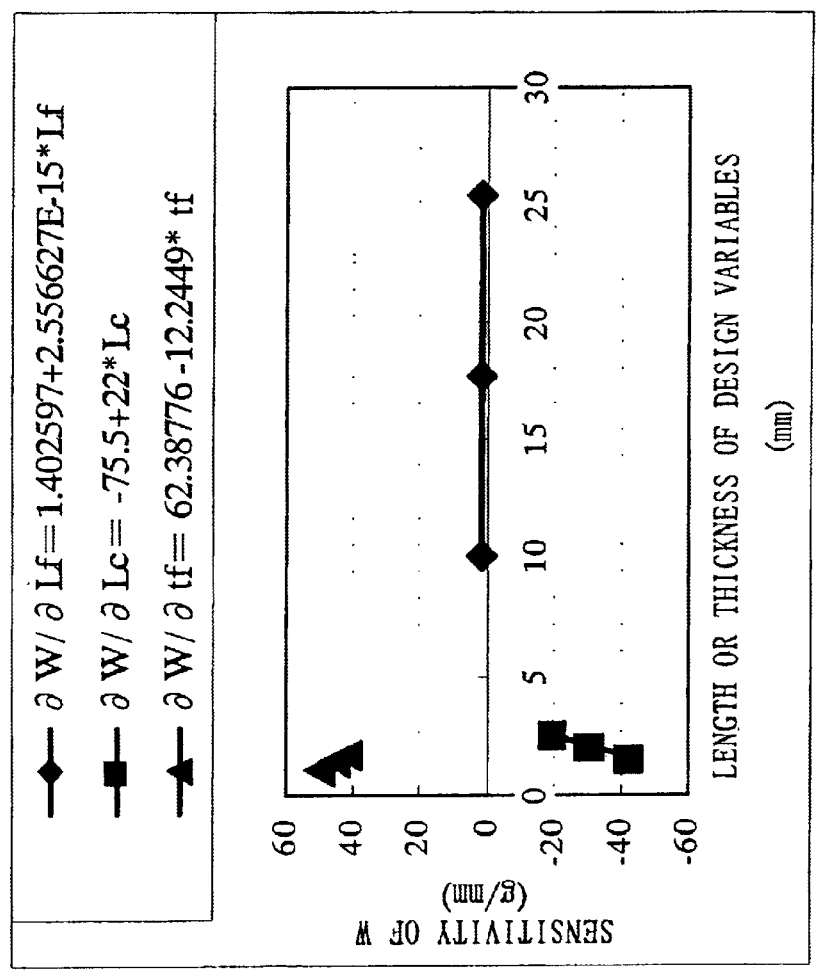
FIG. 23 shows a result of sensitivity analysis by partially differentiating a polynomial estimation expression regarding conductance G and weight W with respect to each of design variables Lf, Lc and tf.
Figure 24:
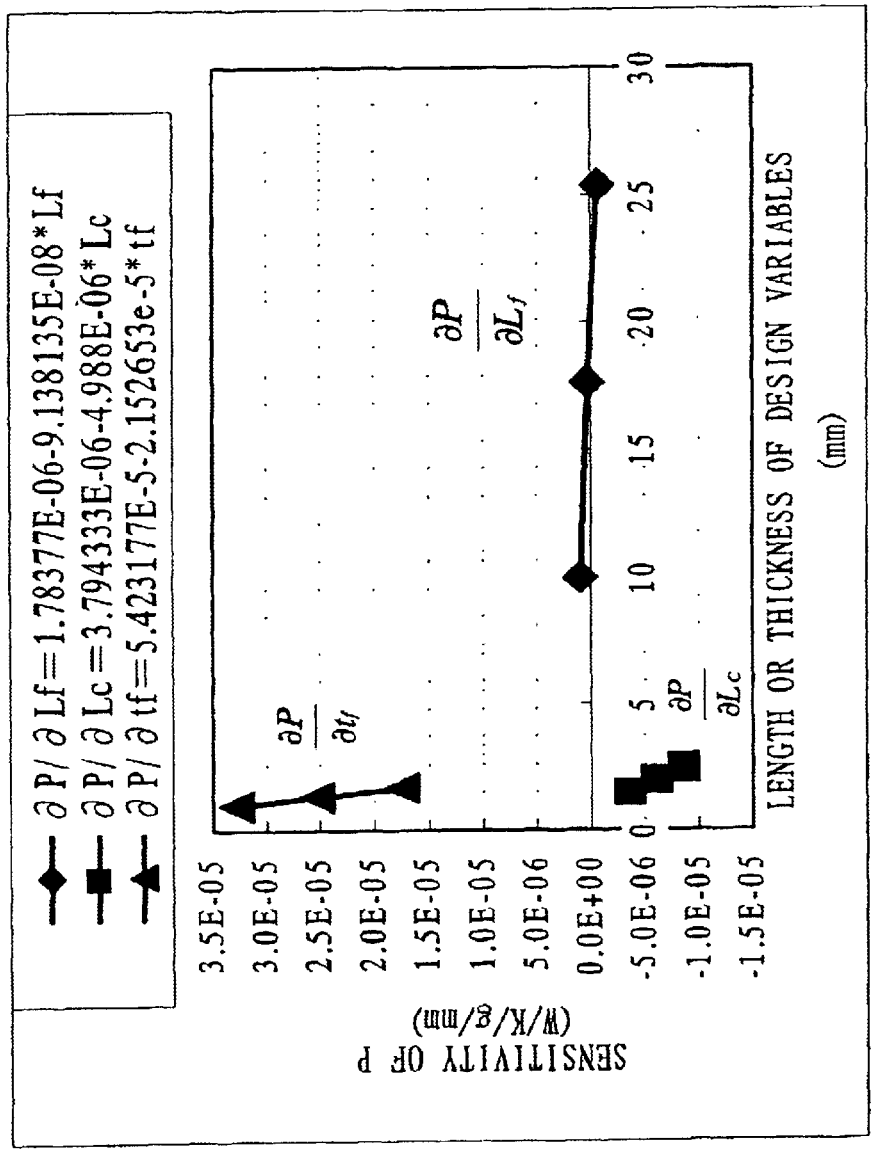
FIG. 24 shows a result of sensitivity analysis by partially differentiating a polynomial estimation expression regarding conductance G and weight W with respect to each of design variables Lf, Lc and tf.

FIGS. 22–24 illustrate results of sensitivity analysis by partially differentiating polynomial estimation expressions $G_{(RSM)}$ and $W_{(RSM)}$ regarding conductance G and weight W with respect to each of design variables Lf, Lc and tf.

Further, expressions (19) and (20) show results of sensitivity analysis by partially differentiating polynomial estimation expressions $G_{(RSM)}$ and $W_{(RSM)}$ regarding conductance G and weight W with respect to each of design variables Lf, Lc and tf $G_{(RSM)}$=0.3162746+0.002768108*Lf–0.00005962897*$Lf^2$–0.01977126*Lc+0.00050827*$Lc^2$+0.08500013*tf–0.01431088*$tf^2$ $$\left.\begin{aligned}\frac{\partial G}{\partial L_f} &= 2.768108E - 03 - 1.192579E - 04 * L_f \\ \frac{\partial G}{\partial L_c} &= -1.977126E - 02 + 1.01654E - 03 * L_c \\ \frac{\partial G}{\partial t_f} &= 8.500013E - 02 - 2.862176E - 02 * t_f\end{aligned}\right\} \tag{19}$$

$W_{(RSM)}$=1283.375+1.402597*Lf–1.278314E–15*$Lf^2$–75.5*Lc+11*$Lc^2$+62.38776*tf–6.122449*$tf^2$ $$\left.\begin{aligned}\frac{\partial W}{\partial L_f} &= 1.402597 + 2.556627E - 15 * L_f \\ \frac{\partial W}{\partial L_c} &= -75.5 + 22 * L_c \\ \frac{\partial W}{\partial t_f} &= 62.38776 - 12.2449 * t_f\end{aligned}\right\} \tag{20}$$

Based on an analysis result of solution space distribution (FIGS. 13–21) by using the estimation expression and a result of sensitivity analysis (FIGS. 22–24), it is possible to obtain quantitative design guidelines, suggestion and knowledge for improvement as shown in the following (a)–(c).

(a) Extension of the fin length Lf gives a small thermal effect compared with an increase in the weight. Therefore, Lf=about 11.7 mm is appropriate from a point of the fin efficiency.

(b) The cut length Lc of the lateral heat pipe influences the weight. However, an effect on the thermal performance is small. Therefore, it is desirable to adopt a cut length close to an upper limit, i.e., Lc=2.5 mm.

(3) An increase in the fin thickness tf gives an impact on an increase in a total weight. Further, it is an important factor (performance adjustment parameter) which has high sensitivity for improvement of the thermal exchange efficiency at the joint part, and it is necessary to consider and adopt an optimum value.

Validity of the simple physical model using an optimum value obtained by the above analysis is verified.

As stated earlier, by applying the sequential quadratic programming method to a 2-dimensional response surface estimation expression generated regarding the thermal conductance and weight, a parameter value (Lf=11.7 mm, Lc=2.5 mm, tf=1.44 mm) for minimizing a weight W of the objective function is identified by using a thermal conductance G of a present heat pipe as a constraint condition value.

A 1-dimensional thermal circuit calculation model is assumed, and the validity of the obtained solution is verified as a physical phenomenon.

Figure 25:
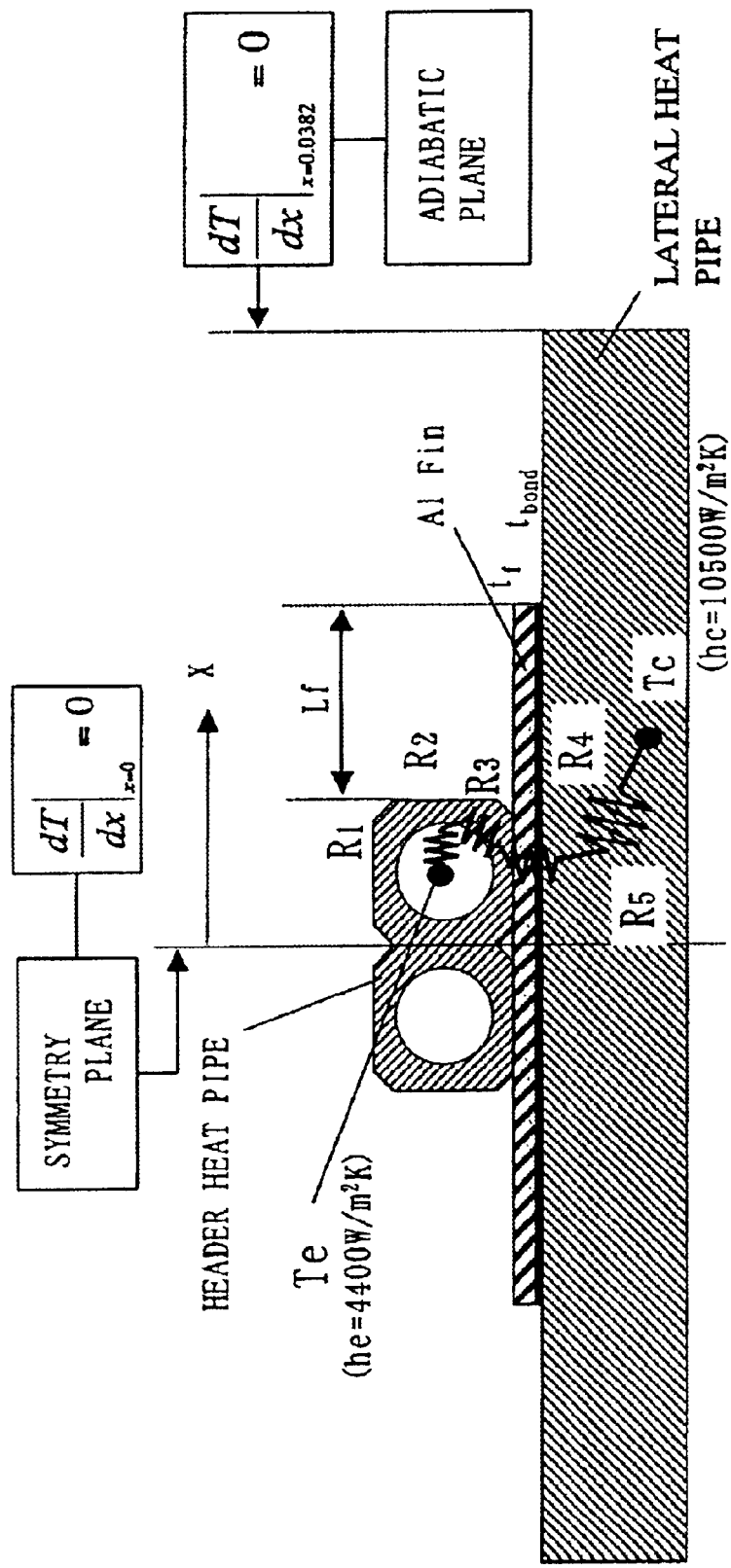
FIG. 25 illustrates a simple calculation model.

FIG. 25 illustrates a simple calculation model.

Similarly, expression (21) shows the used simple calculation model.

In expression (21), a value $\Delta Tce$ obtained by deducting Te from Tc, evaporating heat resistance $R_1$ in the header heat pipe, conducting heat resistance $R_2$ of a header heat pipe container, conducting heat resistance $R_3$ of a fin, conducting heat resistance $R_4$ of a lateral heat pipe container, condensing heat resistance $R_5$ in the lateral heat pipe, an area $A_{hpi}$ of an inner wall of the heat pipe, a surface area $A_{fin}$ of a fin, fin efficiency $\eta_{fin}$, and a coefficient $\lambda_{al}$ of thermal conductivity of aluminum are used.

$$\begin{aligned}\Delta T_{ce} &= \dot{Q} * (R_1 + R_2 + R_3 + R_4 + R_5) \\ &= \dot{Q} * \left(\frac{1}{h_e \cdot A_{hpi}} + R_2 + \frac{1}{h_{eff} \cdot A_{fin} \cdot \eta_{fin}}\right)\end{aligned} \tag{21}$$

$$\eta fin = \frac{\tanh mL_f}{mL_f} \tag{22}$$

$$m = \sqrt{\frac{h_{eff}}{\lambda_{Al} \cdot t_f}}$$

By using expression (23), $h_{eff}$ is calculated.

In expression (23), a thickness $t_{bond}$ of bond and a coefficient $\lambda_{bond}$ of thermal conductivity of bond are used.

$$h_{eff} = \frac{1}{(R_4 + R_5)A_{fin}} \quad (23)$$

$$R_4 + R_5 = \frac{t_{bond}}{\lambda_{bond} \cdot A_{fin}} + \frac{1}{h_c \cdot A_{fin}}$$

Figure 26:
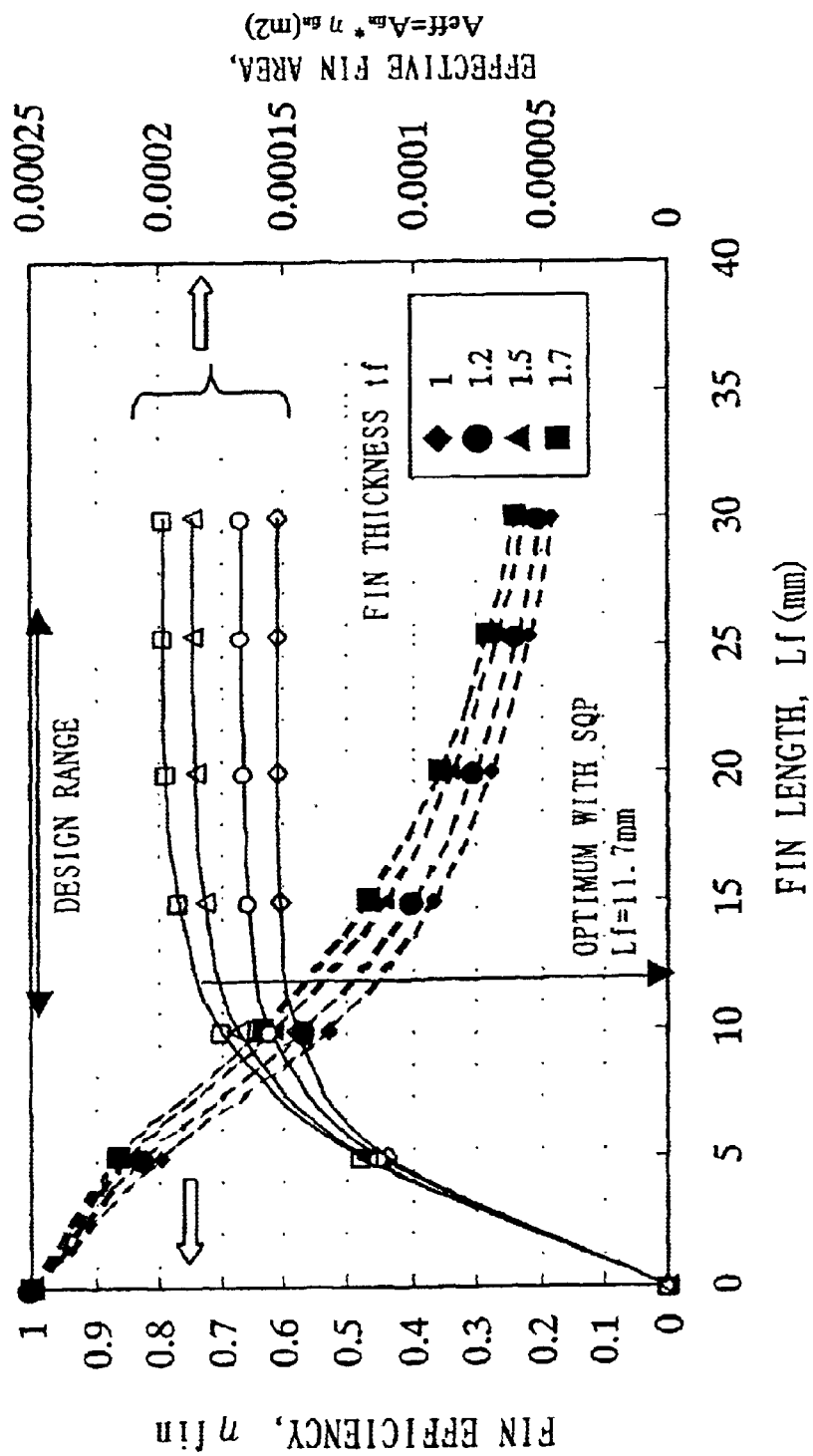
FIG. 26 shows a graph of an effective fin area Aeff of the fin 25 as a flange fin 25 (length 27.4 mm in an axial direction) for thermal exchange calculated from expression (24)

FIG. 26 shows a graph of a calculation result of an effective area $A_{eff}$ of the fin 25 as the flange fin 25 (a length in an axial direction is 27.4 mm) for the thermal exchange by using expression (24). When the fin length Lf exceeds 10 mm, an effect of extension of a heat receipt fin is reduced and stabilized. Therefore, it can be known that about 15 mm is sufficient in an assumed designing range of the thickness tf. Consequently, the optimum value (Lf=11.7 mm) identified by the sequential quadratic programming by using the response surface estimation expression is also appropriate in analyzing a heat transfer phenomenon.

$$A_{eff} = \eta_{fin} \cdot A_{fin} \quad (24)$$

The above explanation can be summarized as follows.

In FIG. 27, the heat pipe according to the related art and an optimum heat pipe are compared.

A polynomial estimation expression for predicting the thermal conductance and weight of the header/lateral heat pipe for the spacecraft panel with high accuracy is generated by the 3-dimensional finite element method and the response surface method using detailed shape CAD data.

Then, by performing sensitivity analysis concerning on the above polynomial estimation expression, it is possible to know sensitivity of influence of the design variables Lf, Lc, tf in a geometric shape of the header/lateral heat pipe on the thermal conductance G and weight W and solution space distribution.

Design guidelines obtained from a result of sensitivity analysis is shown in following (a)–(c).

(a) Extension of the fin length Lf gives a small thermal effect compared with an increase in the weight. Therefore, Lf=about 11.7 mm is appropriate also from a point of the fin efficiency.

(b) The cut length Lc of the lateral heat pipe influences the weight. However, an effect on the thermal performance is small. Therefore, it is desirable to adopt a cut length close to an upper limit, i.e., Lc=2.5 mm.

(3) An increase in the fin thickness tf gives an impact on an increase in a total weight. Further, it is an important factor (performance adjustment parameter) which has high sensitivity for improvement of the thermal exchange efficiency at the joint part, and it is necessary to consider and adopt an optimum value.

Finally, by applying the sequential quadratic programming method to a 2-dimensional response surface estimation expression generated regarding the thermal conductance and weight, a parameter for minimizing a weight W of the objective function is identified by using a thermal conductance G of a present heat pipe as a constraint condition value. An identified optimum parameter solution is Lf=11.7 mm, Lc=2.5 mm, tf=1.44 mm. It is possible to reduce the weight of the heat pipe while maintaining the thermal performance of present products (refer to FIG. 27).

According to an analysis method in this embodiment, an optimum solution is obtained mathematically by applying the analysis by the 3-dimensional finite element method and the response surface method with high accuracy using the detailed design data. It has been proven that the analysis method is practical and effective in the thermal and weight optimization problem of the shape of the heat panel in the spacecraft.

As stated, the header heat pipe 200 in this embodiment is the header heat pipe 200 for the spacecraft panel.

The header heat pipe 200 includes the fin 25 in a flat plate form in the fin length Lf of 0.8–0.9 times of the outer width Dhp extended from an edge of an outer shape of the header heat pipe 200 in parallel with a direction of the outer width of the header heat pipe 200.

The fin 25 has a thickness of 0.1–0.2 times of the length Lf in an orthogonal direction to the length Lf.

When the outer width of the header heat pipe 200 changes, the length Lf and the thickness tf can change in proportion to the outer width of the header heat pipe 200. Concerning on a value of ratio, a value at second decimal place or below does not influence a result of the analysis, and a similar effect can be realized.

As stated, the lateral heat pipe 100 in this embodiment is the lateral heat pipe 100 for the spacecraft panel.

The lateral heat pipe 100 includes the flat part 11 for transferring heat to outer space in a length (about 8 mm=13 mm (Dhp)–2.5 mm (Lc)×2) of 0.6–0.7 times of the outer width Dhp in parallel with a direction of the outer width of the lateral heat pipe 100.

When the outer width of the lateral heat pipe 100 changes, the length can change in proportion to the outer width of the lateral heat pipe 100. Concerning on a value of ratio, a value at second decimal place or below does not influence a result of the analysis, and a similar effect can be realized Embodiment 3.

In Embodiment 3, the optimum value in Embodiment 2 is further developed. Ranges of Lf, Lc, tf which can be used as robust ranges are considered and used in Embodiment 3.

Figure 28:
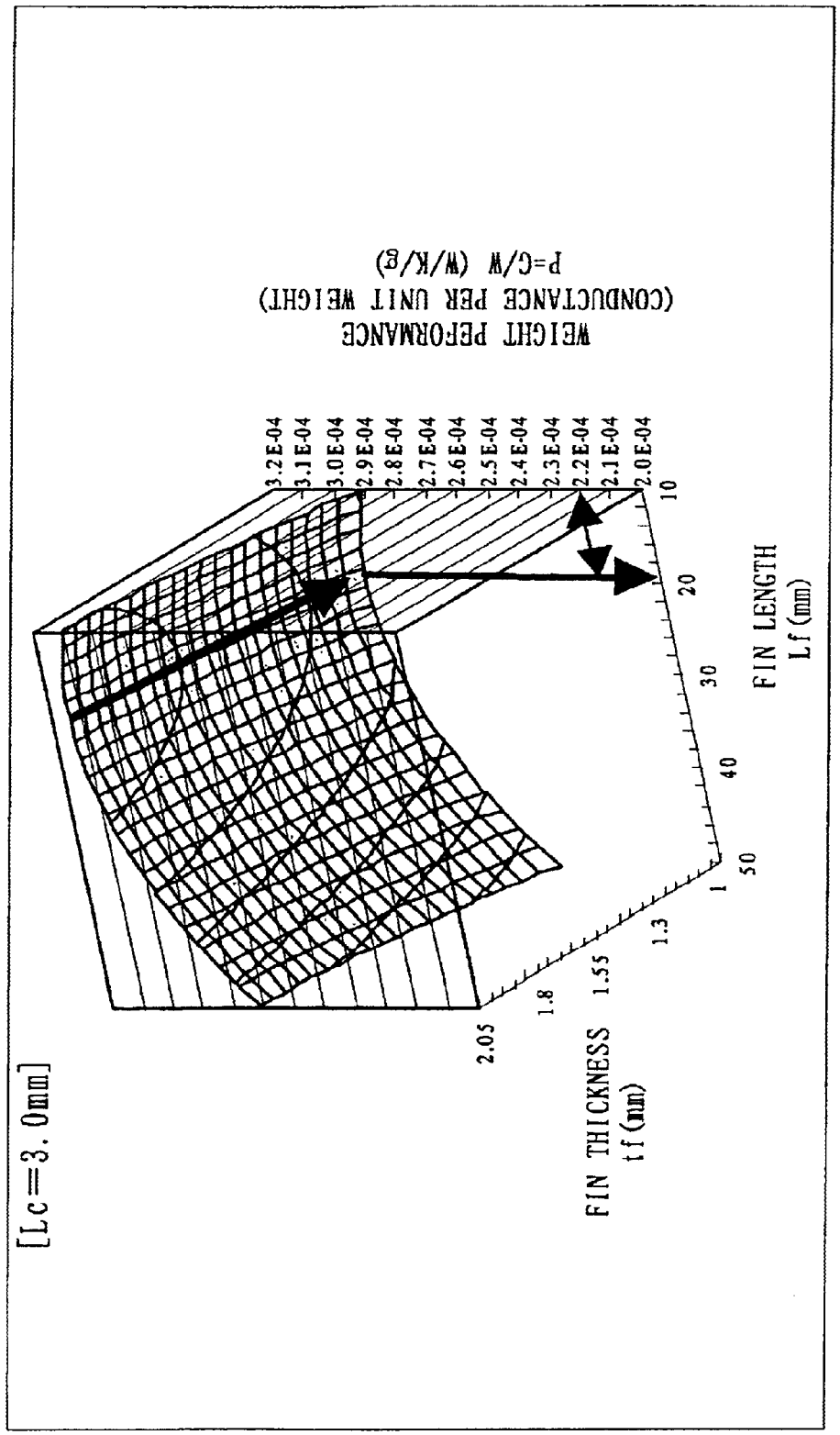
FIG. 28 illustrates a robust optimization range of a fin length Lf corresponding to a fin thickness tf.

FIG. 28 illustrates a robust optimization range of the fin length Lf corresponding to the fin thickness tf.

In FIG. 28, a vertical axis shows heat transfer performance (conductance) per unit weight and a horizontal axis shows the fin thickness tf and the fin length Lf. Lc is fixed at 3.0 mm.

In FIG. 28, for each fin thickness tf, the heat transfer performance per unit weight shows a maximum value when Lf is around 20 mm. However, when a value of Lf is increased, a total weight becomes heavier.

Therefore, the robust optimization range of 10 mm≦Lf≦20 mm should be set for balancing the heat and the weight.

As stated, by setting a range of Lf as 10 mm≦Lf≦20 mm, it is possible to obtain the heat pipe with a good total balance of the heat and the weight based on the guidelines on the sectional shape of the heat pipe and the joint structure without causing a temperature drop while reducing the weight.

Figure 29:
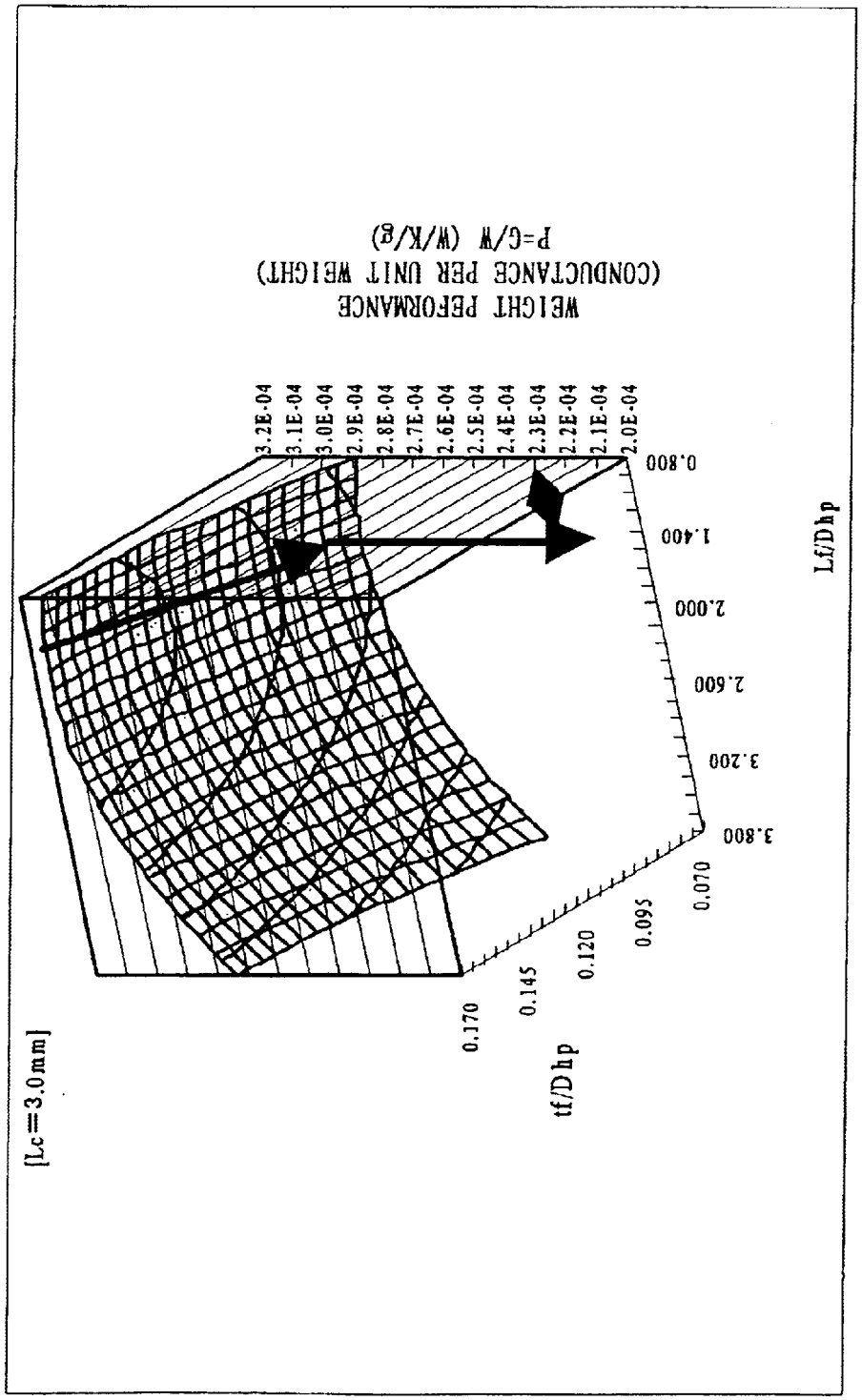
FIG. 29 illustrates a robust optimization range of the fin length Lf divided by an outer width Dhp of the heat pipe corresponding to the fin thickness tf divided by the outer width Dhp of the heat pipe.

FIG. 29 illustrates a robust optimization range of the fin length Lf divided by the outer width Dhp of the heat pipe corresponding to the fin thickness tf divided by the outer width Dhp.

In FIG. 29, a vertical axis shows heat transfer performance (conductance) per unit weight and a horizontal axis shows the fin length Lf divided by the outer width Dhp of the heat pipe (tf/Dhp) and the fin thickness tf divided by the outer width Dhp (LF/Dhp). Lc is fixed at 3.0 mm.

In FIG. 29, for each fin thickness tf divided by the outer width Dhp of the heat pipe, the heat transfer performance per unit weight shows a maximum value when Lf divided by the outer width Dhp of the heat pipe is around 0.8–1.5.

Therefore, it is also possible to set the robust optimization range of 0.8≦Lf/Dhp≦1.5.

As stated, by setting a range of Lf/Dhp as 0.8≦Lf/Dhp≦1.5, it is possible to obtain the heat pipe with a good total balance of the heat and the weight based on the guidelines on the sectional shape of the heat pipe and the joint structure without causing a temperature drop while reducing the weight.

Figure 30:
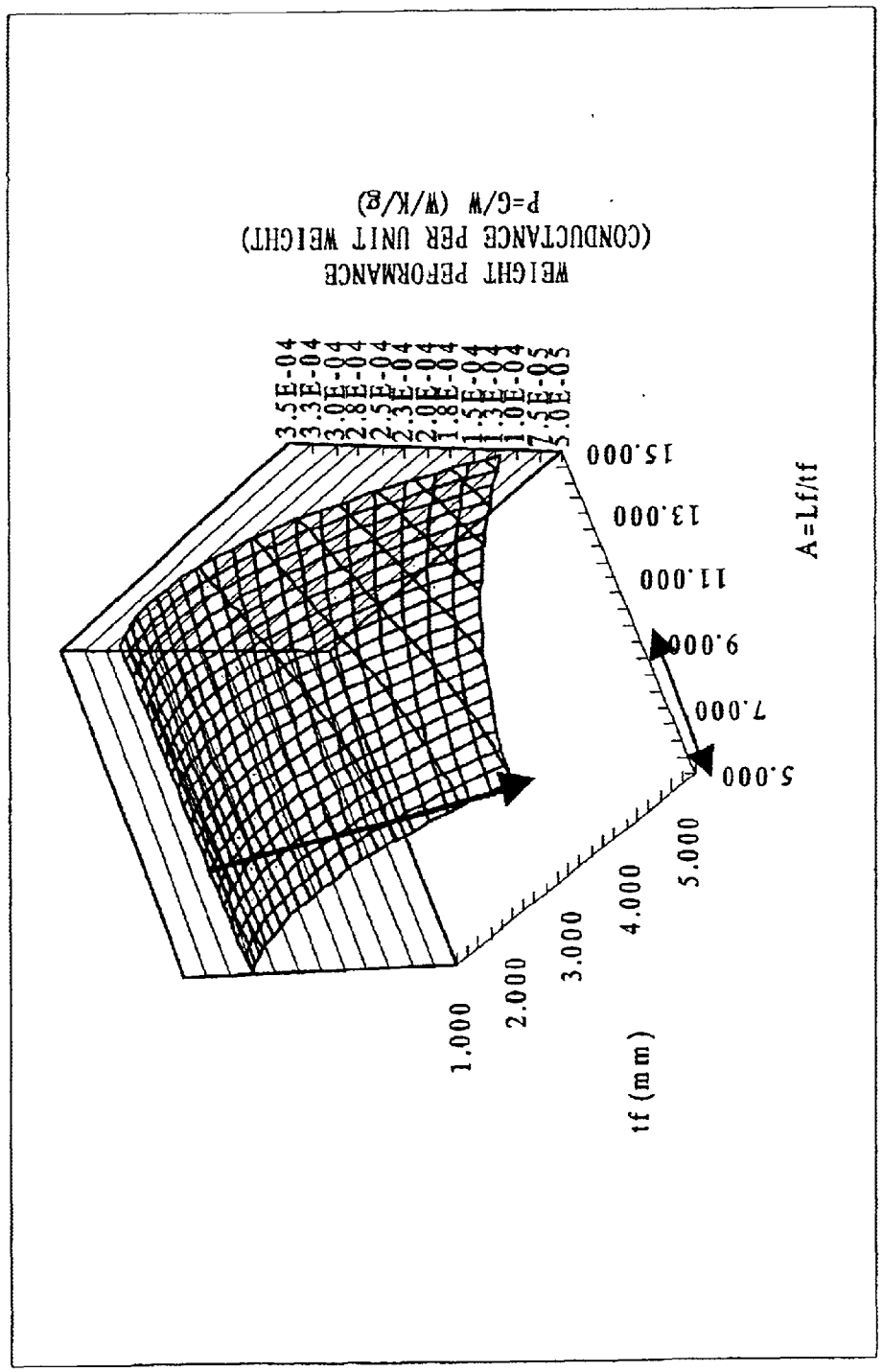
FIG. 30 illustrates a robust optimization range of the fin length Lf divided by the fin thickness tf corresponding to the fin thickness tf.

FIG. 30 illustrates a robust optimization range of the fin length Lf divided by the fin thickness tf corresponding to the fin thickness tf.

In FIG. 30, a vertical axis shows heat transfer performance per unit weight and a horizontal axis shows the fin length Lf divided by the fin thickness tf (aspect ratio: A=Lf/tf). Lc is fixed at 3.0 mm.

Figure 31:
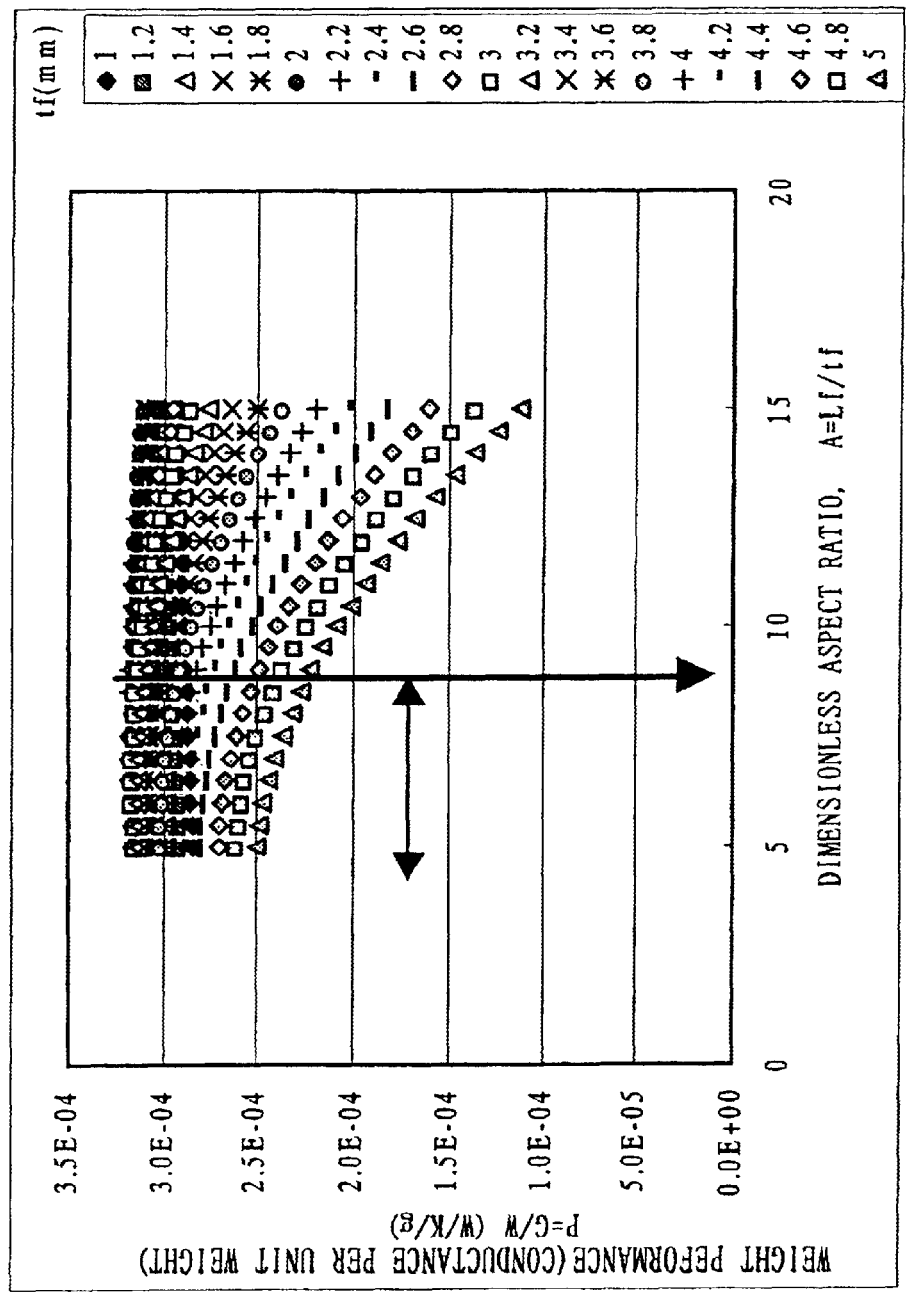
FIG. 31 illustrates relationship between the fin thickness tf and an aspect ratio A.

FIG. 31 shows relationship between the fin thickness tf and the aspect ratio A.

In FIG. 31, a vertical axis shows heat transfer performance per unit weight and a horizontal axis shows the aspect ratio A for each fin thickness tf.

FIG. 31 shows that an influence on a change in the fin thickness tf is small when the aspect ratio A is in a range of around 4–9.

Figure 32:
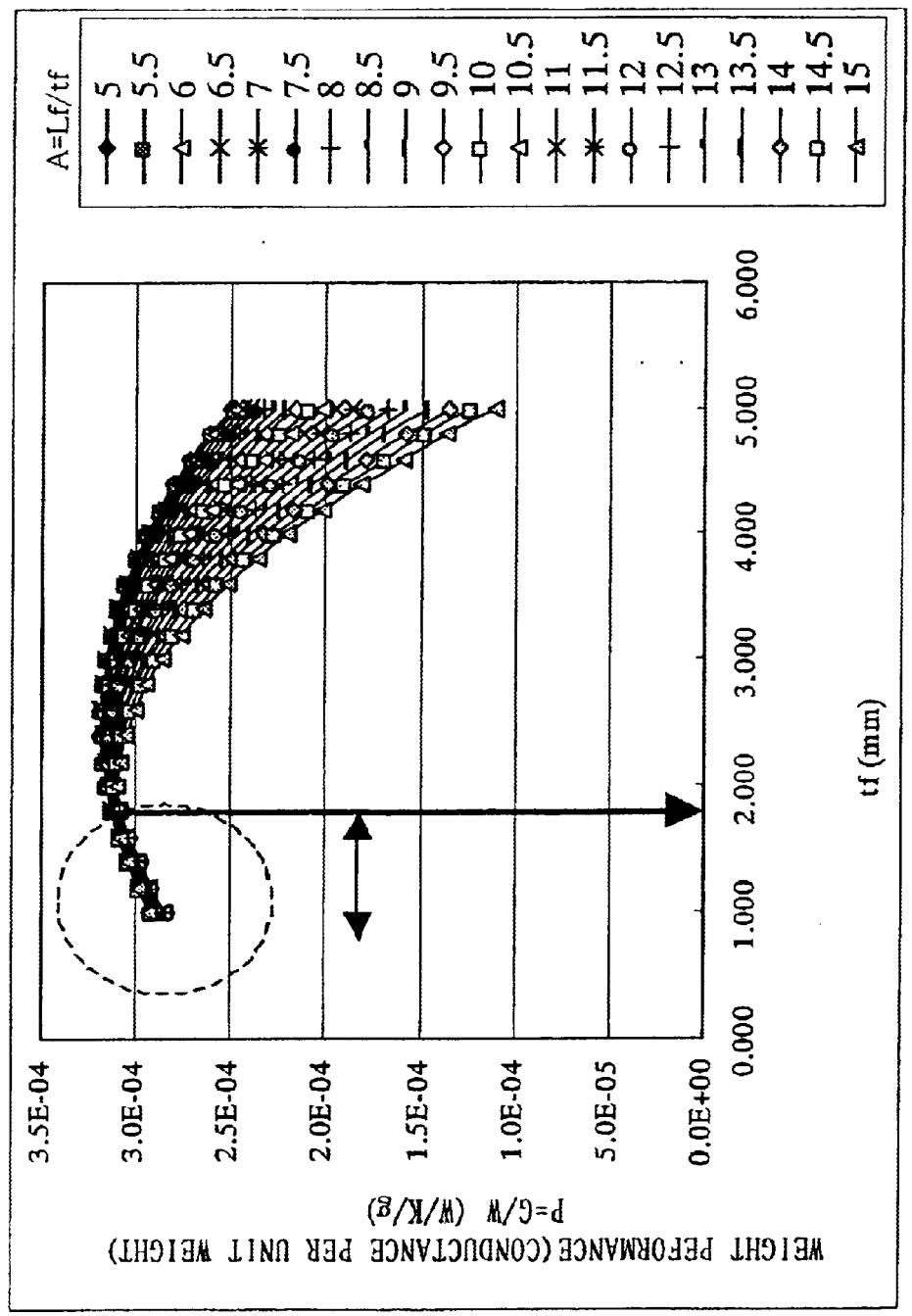
FIG. 32 illustrates relationship between the fin thickness tf and the aspect ratio A.

FIG. 32 shows relationship between the fin thickness tf and the aspect ratio A.

In FIG. 32, a vertical axis shows heat transfer performance per unit weight and a horizontal axis shows the aspect ratio A for each fin thickness tf.

FIG. 32 shows that there is more influence of the aspect ratio A when the fin thickness tf increases. When the fin thickness tf is in a range of around 1 mm–2 mm, the heat transfer performance per unit weight shows a good value without influence of the aspect ratio A.

Therefore, it is also possible to show the robust optimization range of $4 \leq Lf/tf \leq 9$ when $1 \text{ mm} \leq tf \leq 2 \text{ mm}$.

As stated, by setting a range of tf as $1 \text{ mm} \leq tf \leq 2 \text{ mm}$ and a range of Lf/tf as $4 \leq Lf/tf \leq 9$, it is possible to obtain the heat pipe with a good total balance of the heat and the weight based on the guidelines on the sectional shape of the heat pipe and the joint structure without causing a temperature drop while reducing the weight.

FIGS. 28–32 show solution space graphs created based on expressions (11) and (12) as in Embodiment 2.

As stated, the header heat pipe 200 in Embodiment 3 is the header heat pipe 200 for the spacecraft panel.

The header heat pipe 200 includes the fin 25 in a flat plate form in the length Lf of 10 mm–20 mm extended from the edge of the outer shape of the header heat pipe 200 in parallel with a direction of the outer width of the header heat pipe 200.

Further, the header heat pipe 200 is the header heat pipe 200 for the spacecraft panel.

The header heat pipe 200 includes the fin 25 in a flat plate form in the length Lf of 0.8–1.5 times of the outer width Dhp extended from the edge of the outer shape of the header heat pipe 200 in parallel with a direction of the outer width of the header heat pipe 200.

Further, the header heat pipe 200 includes the fin 25 in a flat plate form for the spacecraft panel. The fin 25 has the thickness tf of 1–2 mm and the length Lf of 4–9 times of the outer width Dhp extended from the edge of the outer shape of the header heat pipe 200.

Embodiment 4.

In Embodiment 4, the optimum value in Embodiment 2 is further developed. Ranges of Lf, Lc and additional variables tch and tcl which can be used as robust ranges are considered and used in Embodiment 4.

A variable tch is a thickness of the fin 28 as shown in FIG. 1. A variable tcl is a thickness of the fin 18 as shown in FIG. 2.

Figure 33:
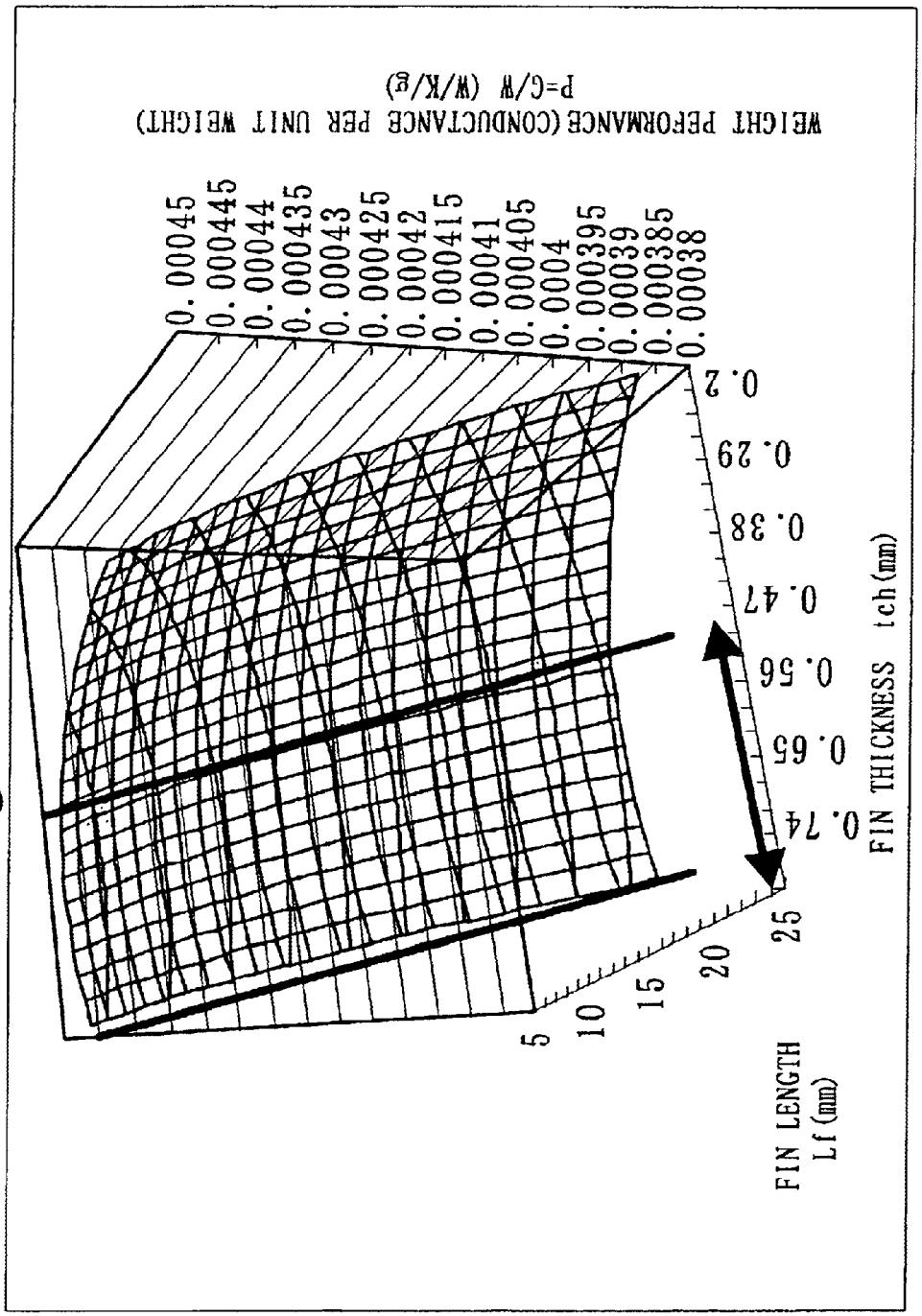
FIG. 33 illustrates a robust optimization range of a fin thickness tch corresponding to the fin length Lf.

FIG. 33 illustrates a robust optimization range of the fin thickness tch corresponding to the fin length Lf.

In FIG. 33, a vertical axis shows heat transfer performance (heat conductance) per unit weight and a horizontal axis shows the fin length Lf and the fin thickness tch. Lc is fixed at 0 mm.

FIG. 33 shows that a range of around 0.5–0.8 is a preferred range of the fin thickness tch regardless of the fin length Lf.

Therefore, it is also possible to show the robust optimization range of $0.5 \leq tch \leq 0.8$.

As stated, by setting a range of tch as $0.5 \leq tch \leq 0.8$, it is possible to obtain the heat pipe with a good total balance of the heat and the weight based on the guidelines on the sectional shape of the heat pipe and the joint structure without causing a temperature drop while reducing the weight.

Figure 34:
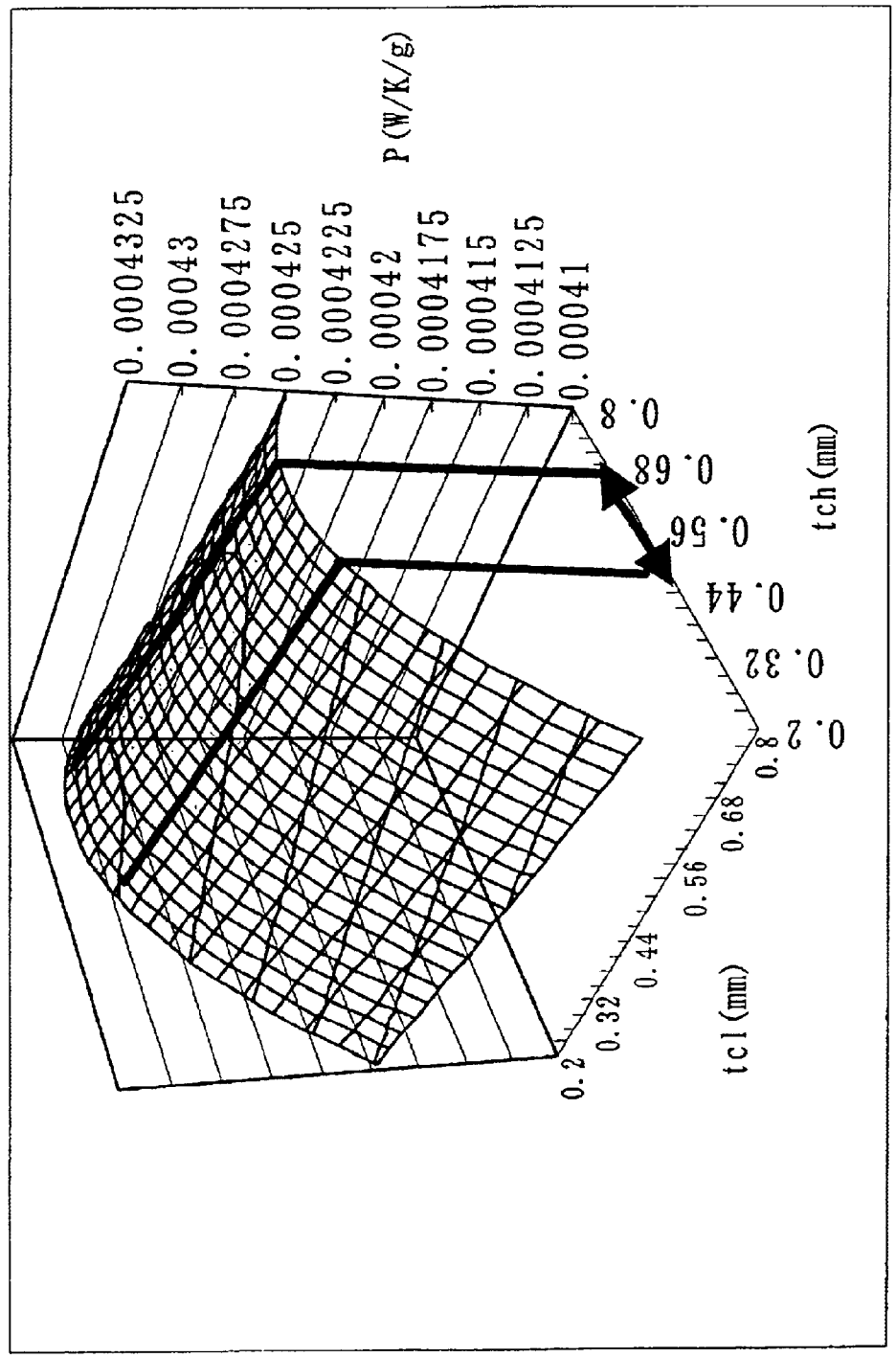
FIG. 34 illustrates a robust optimization range of the fin thickness tch corresponding to a fin thickness tcl.

FIG. 34 illustrates a robust optimization range of the fin thickness tch corresponding to the fin thickness tcl.

In FIG. 34, a vertical axis shows heat transfer performance (heat conductance) per unit weight and a horizontal axis shows the fin thickness tcl and the fin thickness tch. Lc is fixed at 0 mm.

FIG. 34 shows that a range of around 0.5–0.8 is a preferred range of the fin thickness tch regardless of the fin thickness tcl.

Therefore, it is also possible to set the robust optimization range of $0.5 \leq tch \leq 0.8$.

As stated, by setting a range of tch as $0.5 \leq tch \leq 0.8$, it is possible to obtain the heat pipe with a good total balance of the heat and the weight based on the guidelines on the sectional shape of the heat pipe and the joint structure without causing a temperature drop while reducing the weight.

Figure 35:
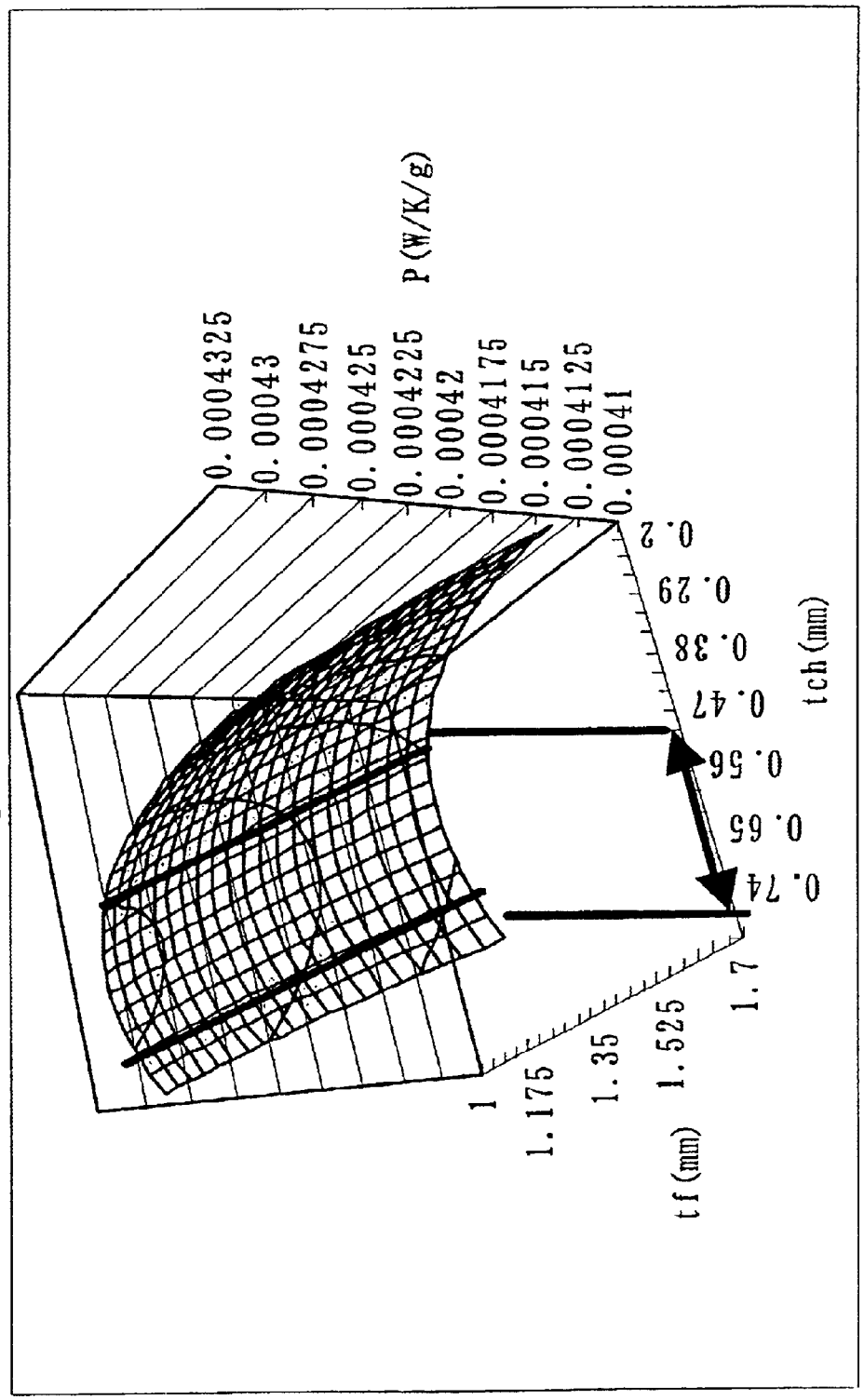
FIG. 35 illustrates a robust optimization range of the fin thickness tch corresponding to the fin thickness tf.

FIG. 35 illustrates a robust optimization range of the fin thickness tch corresponding to the fin thickness tf.

In FIG. 35, a vertical axis shows heat transfer performance (heat conductance) per unit weight and a horizontal axis shows the fin thickness tf and the fin thickness tch. Lc is fixed at 0 mm.

FIG. 35 shows that a range of around 0.5–0.8 is a preferred range of the fin thickness tch regardless of the fin thickness tf. Therefore, it is also possible to set the robust optimization range of $0.5 \leq tch \leq 0.8$.

As stated, by setting a range of tch as $0.5 \leq tch \leq 0.8$, it is possible to obtain the heat pipe with a good total balance of the heat and the weight based on the guidelines on the sectional shape of the heat pipe and the joint structure without causing a temperature drop while reducing the weight.

Figure 36:
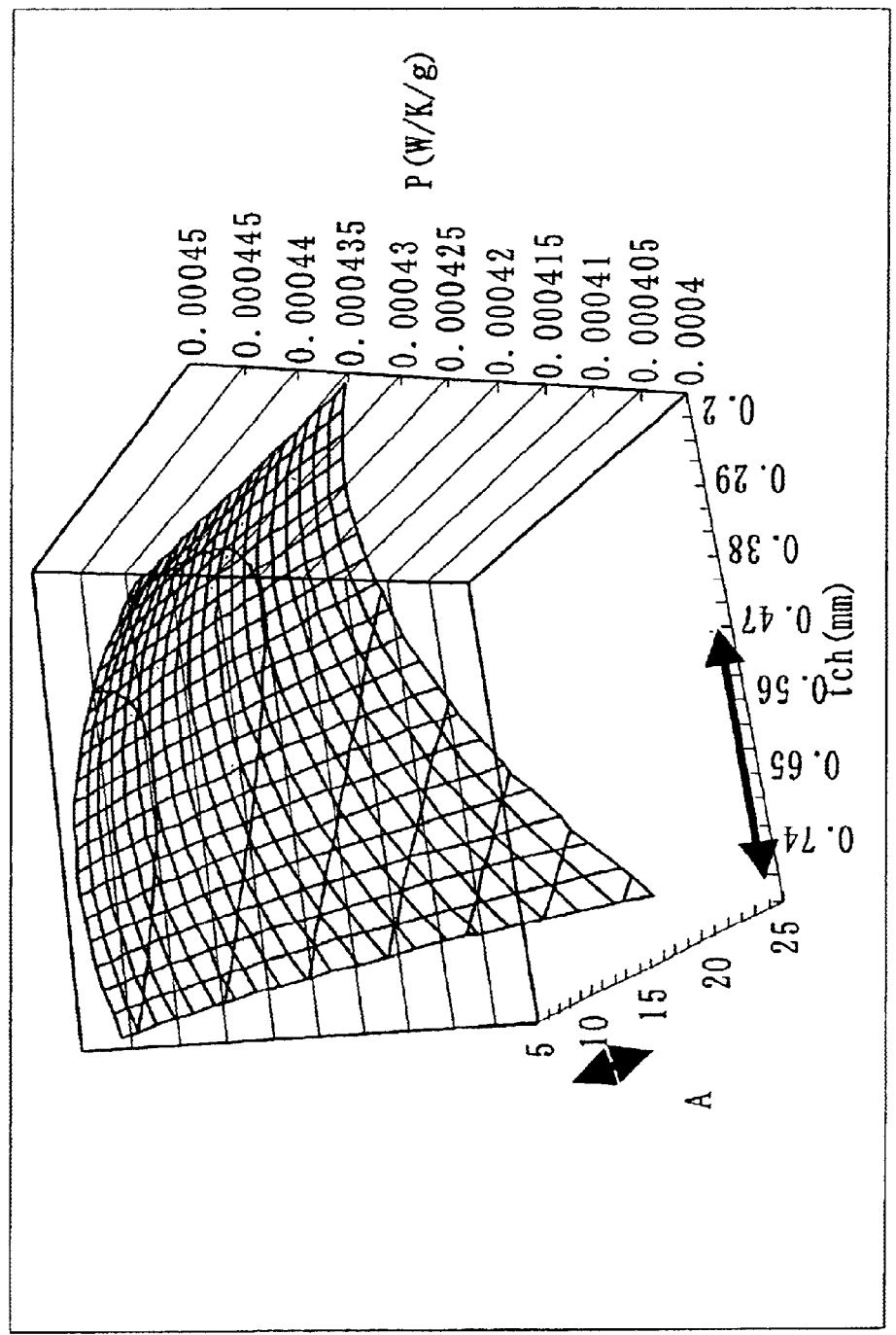
FIG. 36 illustrates a robust optimization range of the fin thickness tch corresponding to the fin length Lf divided by the fin thickness tch.

FIG. 36 illustrates a robust optimization range of the fin thickness tch corresponding to the fin length Lf divided by the fin thickness tch.

In FIG. 36, a vertical axis shows heat transfer performance (heat conductance) per unit weight and a horizontal axis shows the fin length Lf divided by the fin thickness tch (aspect ratio: A=Lf/tch) and the fin thickness tch. Lc is fixed at 0 mm.

FIG. 36 shows relationship between the aspect ratio A and the fin thickness tch.

FIG. 36 shows that a range of around 4–9 is a preferred range of the aspect ratio A and a range of around 0.5–0.8 is a preferred range of the fin thickness tch.

Therefore, it is also possible to set the robust optimization range of $4 \leq A \leq 9$ and $0.5 \leq tch \leq 0.8$.

As stated, by setting a range of $4 \leq A \leq 9$ and $0.5 \leq tch \leq 0.8$, it is possible to obtain the heat pipe with a good total balance of the heat and the weight based on the guidelines on the sectional shape of the heat pipe and the joint structure without causing a temperature drop while reducing the weight.

FIGS. 33–36 show solution space graphs created based on expressions (11) and (12) as in Embodiment 2.

As stated, the fin 28 included in the header heat pipe in Embodiment 4 has a thickness of 0.5–0.8 mm in an orthogonal direction to the heat transfer plane.

The fin 28 has a determined thickness tch in an orthogonal direction to the heat transfer plane.

The fin 25 has a length Lf of 4–9 times of the determined thickness tch from the edge of the outer shape in one direction which is the adjacent direction 22 of the plurality of pipe parts 24 to an edge of the extended heat transfer plane.

According to a preferred embodiment of this invention, the heat transfer area can be increase while reducing the weight. Therefore, the thermal exchange between the header heat pipe and the lateral heat pipe can be expedited. Further, the accuracy in the press-out processing can be maintained at a high level.

According to the preferred embodiment of this invention, the accuracy in the press-out processing can be maintained at a high level while reducing the weight.

According to the preferred embodiment of this invention, the thermal exchange between the header heat pipe and the lateral heat pipe can be expedited while reducing the weight.

According to the preferred embodiment of this invention, it is possible to obtain the heat pipe with a good total balance of the heat and the weight based on the guidelines on the sectional shape of the heat pipe and the joint structure without causing a temperature drop while reducing the weight.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is limited only as defined in the following claims and the equivalents thereto.

What is claimed is:

1. A heat pipe comprising:
   a plurality of pipe parts for performing at least one of absorption of heat and
   radiation of heat through an outer surface, which are adjacent toward one direction;
   a flat part including a heat transfer plane in a flat form for performing at least one of absorption of heat from and radiation of heat into outer space, created on a part of the outer surface of each of the plurality of pipe parts to be integrated with each of the pipe parts;
   an extended heat transfer plate in a flat form continuing without an uneven part from the heat transfer plane included in the flat part for providing or each of the plurality of pipe parts a heat transfer plane further extended from the heat transfer plane toward an adjacent pipe part, wherein the extended heat transfer plate is created in a plate form; and
   a concave part created from a back side of the heat transfer plane provided by the extended heat transfer plate toward the adjacent pipe part.

2. The heat pipe of claim 1, further comprising second extended heat transfer plate besides the extended heat transfer plate, in a flat form continuing without an uneven part from the heat transfer plane included in the flat part integrated with a pipe part placed at an end of the plurality of pip parts, for providing a heat transfer plane further extended from the heat transfer plane toward outer space.

3. The heat pipe of claim 1, wherein the extend d heat transfer plate has a thickness of 0.5 mm–0.8 mm in an orthogonal direction to the heat transfer plane.

4. The heat pipe of claim 2, wherein the extended heat transfer plate has a determined thickness in an orthogonal direction to the heat transfer plane, wherein the second extended heat transfer plate has a length of 4–9 times of the determined thickness from the edge of the outer shape in one direction of the plurality of pipe parts to the edge of the heat transfer plane further extended.

\* \* \* \* \*